(12) United States Patent
Lasch et al.

(10) Patent No.: US 8,033,474 B2
(45) Date of Patent: *Oct. 11, 2011

(54) INFRARED BLOCKING ARTICLE

(75) Inventors: Ellen Lasch, New York, NY (US); Lisa Ann Morrill-Webb, West Sussex (GB); Judy Vigiletti, Croton on Hudson, NY (US); William J. Faenza, Jr., Andreas, PA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,303

(22) Filed: Oct. 19, 2010

(65) Prior Publication Data

US 2011/0031318 A1 Feb. 10, 2011

Related U.S. Application Data

(63) Continuation of application No. 12/418,510, filed on Apr. 3, 2009, now Pat. No. 7,837,118, which is a continuation of application No. 12/062,489, filed on Apr. 3, 2008, now abandoned, which is a continuation of application No. 10/394,914, filed on Mar. 21, 2003, now Pat. No. 7,377,443, which is a continuation of application No. 10/092,681, filed on Mar. 7, 2002, now Pat. No. 6,764,014, which is a continuation-in-part of application No. 10/062,106, filed on Jan. 31, 2002, now Pat. No. 6,749,123, which is a continuation-in-part of application No. 09/653,837, filed on Sep. 1, 2000, now Pat. No. 6,581,839.

(60) Provisional application No. 60/153,112, filed on Sep. 7, 1999, provisional application No. 60/160,519, filed on Oct. 20, 1999, provisional application No. 60/167,405, filed on Nov. 24, 1999, provisional application No. 60/171,689, filed on Dec. 21, 1999.

(51) Int. Cl.
*G06K 19/06* (2006.01)
(52) U.S. Cl. .................................... 235/491; 235/487
(58) Field of Classification Search ................ 235/487, 235/491
See application file for complete search history.

(56) References Cited

U.S. PATENT DOCUMENTS 3,536,894 A 10/1970 Travioli
(Continued)

FOREIGN PATENT DOCUMENTS

DE 19530608 2/1997
(Continued)

OTHER PUBLICATIONS

USPTO; All Office Actions (Non-Final, Final, Advisory Actions, Restrictions/Elections, etc.), Notices of Allowance, and SB/08As from U.S. Appl. No. 10/821,379; 12/275,924; 12/418,510; 11/879,468; 10/302,658; 10/394,914; 10/288,945; 12/124,937; 12/062,489; 10/611,563; 10/898,078; 10/908,434; 12/859,046.

(Continued)

*Primary Examiner* — Daniel Hess
(74) *Attorney, Agent, or Firm* — Snell & Wilmer L.L.P.

(57) ABSTRACT

The present invention relates to a process for producing an opaque, transparent or translucent transaction card having multiple features, such as a holographic foil, integrated circuit chip, silver magnetic stripe with text on the magnetic stripe, opacity gradient, an invisible optically recognizable compound, a translucent signature field such that the signature on back of the card is visible from the front of the card and an active thru date on the front of the card. The invisible optically recognizable compound is an infrared ink and/or film, which can be detected by a sensor found in an ATM or card assembly line.

18 Claims, 33 Drawing Sheets

U.S. PATENT DOCUMENTS

| | | | |
|---|---|---|---|
| 4,106,857 A | 8/1978 | Snitzer | |
| 5,503,434 A | 4/1996 | Gunn | |
| 5,882,774 A | 3/1999 | Jonza et al. | |
| 6,045,894 A | 4/2000 | Jonza et al. | |
| 6,049,419 A | 4/2000 | Wheatley et al. | |
| 6,255,031 B1 * | 7/2001 | Yao et al. | 430/270.1 |
| 6,327,578 B1 | 12/2001 | Linehan | |
| 6,560,581 B1 | 5/2003 | Fox et al. | |
| 6,799,270 B1 | 9/2004 | Bull et al. | |
| 6,851,051 B1 | 2/2005 | Bolle et al. | |
| 7,837,118 B2 * | 11/2010 | Lasch et al. | 235/491 |
| 2003/0017312 A1 | 1/2003 | Labrousse et al. | |

FOREIGN PATENT DOCUMENTS

DE 29804131 6/1998

OTHER PUBLICATIONS

EP; Decision dated Jul. 14, 2010 for Application No. 00961558.4.
ISR and Written Opinion for PCT/US2009/044075 dated Jul. 2, 2009.
Non-Final Office Action for 12/124,937 dated Nov. 19, 2010.
Non-Final Office Action for 12/907,303 dated Feb. 11, 2011.
Non-Final Office Action for 12/24,937 dated Mar. 10, 2011.
Search Report for Application No. UAE/P/73/2002 dated Jan. 27, 2011.

* cited by examiner

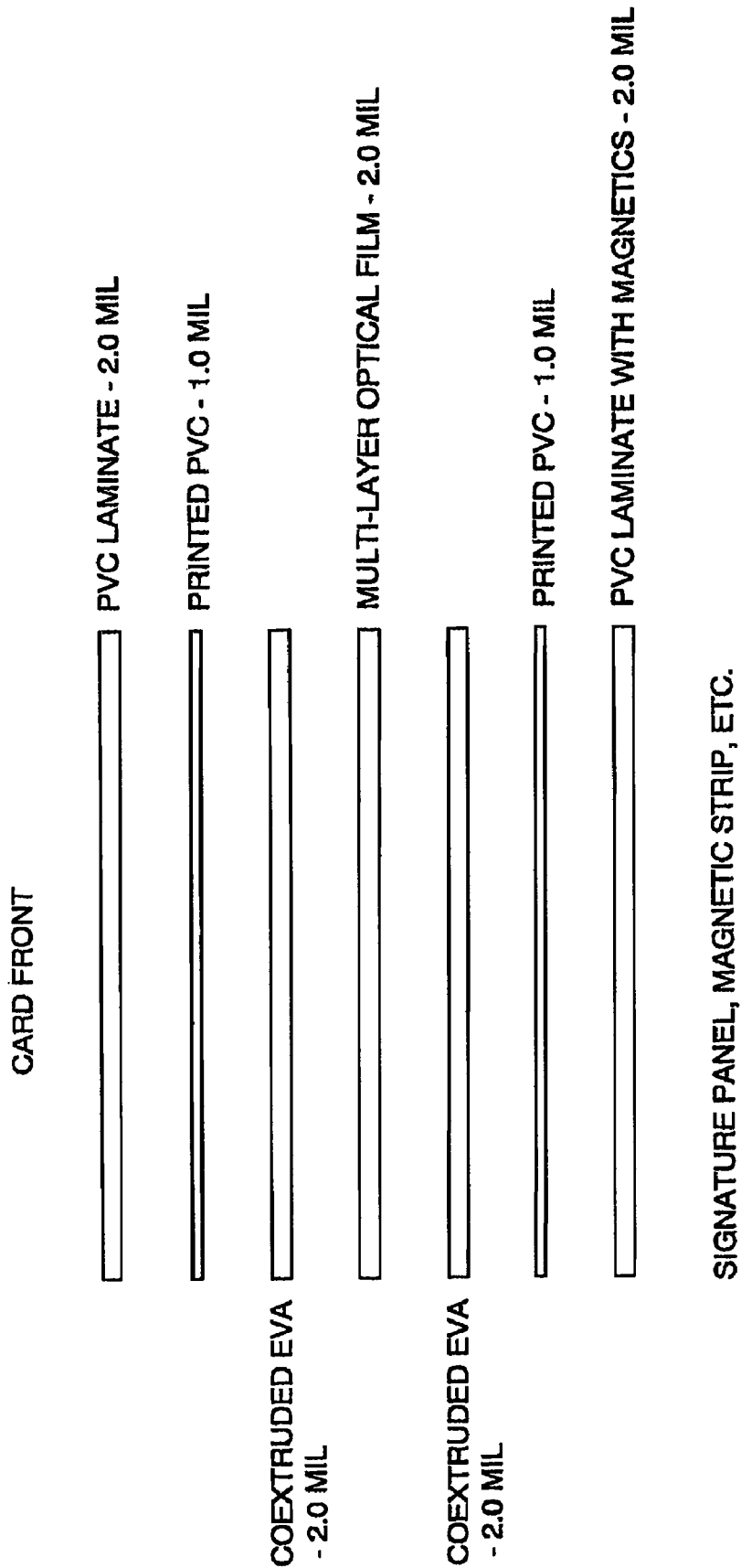

| Number | Material | Specifications | Source | Comments |
|---|---|---|---|---|
| | Construction 1 - white needs work, lamination temperature too low, pvc core bond low. | | | |
| 1 | pvc laminate | 1.60 | oberthur | front 4.1,4.4; back 4.0,4.0 |
| 2 | pet adhesive both sides | 2.50 | allied signal | |
| 3 | printed core - white #1 | 12.00 | oberthur | |
| 4 | printed core - white #1 | 12.00 | oberthur | |
| 5 | wl-35 pvc (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. thickness .030-.031 |
| Total | | 32.80 | | |
| | Construction 2 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | wl-35 pvc (adh to pet) | 2.00 | klockner | |
| Total | | 34.80 | | |
| | Construction 3 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | gomar pvc (adh to pet) | 2.00 | allied signal | |
| Total | | 34.80 | | |
| | Construction 4 - white #2 too dark, temperature too low, pvc lamination bond low | | | |
| 1 | pvc laminate | 1.60 | oberthur | front - 4.0, 4.3; back lt |
| 2 | pet adhesive both sides | 2.50 | allied signal | |
| 3 | printed core - white #2 | 12.00 | oberthur | |
| 4 | printed core - white #2 | 12.00 | oberthur | |
| 5 | bemis (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. thickness .030 - .031 |
| Total | | 32.80 | | |
| | Construction 5 - white #3 too dark, temperature too low - pvc lamination bond low | | | |
| 1 | pvc laminate | 1.60 | oberthur | |
| 2 | pet adhesive both sides | 2.50 | allied signal | |
| 3 | printed core - white #3 | 12.00 | oberthur | |
| 4 | printed core - white #3 | 12.00 | oberthur | |
| 5 | w-35 (adh to xir pet) | 2.00 | klockner | |
| 6 | xir (metal to pet gs) | 1.00 | southwall | |
| 7 | pet glue/stamp | 1.70 | d & k | 1.2 mil adhesive, 0.5 mil pet. thickness .030 - .031 |
| Total | | 32.80 | | |
| | howard 1.0 coating | | | |
| 1 | neocryl b725 | 33.60 | zeneca? | |
| 2 | EtOH | 31.20 | | |
| 3 | nPOAc | 31.20 | | |

FIG. 11

```
    4 citraflex e4              4.00   moreslip, greensboro
Total                         100.00
    Construction #6 - seems to stick ok, best so far, scale up. Make sub-laminat   (aka - s)
    1 pvc laminate              1.60   oberthur
    2 core pvc                 12.00   oberthur
    3 bemis                     2.00   bemis
    4 petgs                     1.70   d & k
    5 xlr (metal to pet gs)     1.00   southwall   plasma treated
    6 bemis                     2.00   bemis
    7 core pvc                 12.00   oberthur
    8 pvc laminate              1.60   oberthur    magnetics
Total                          33.90
    herslow sublamination
Total Price
    Construction #7 - seems to stick ok, best so far, scale up. Make sub-laminat   (aka - t)
    1 pvc laminate              1.60   oberthur
    2 core pvc                 12.00   oberthur
    3 w-35                      2.00   bemis
    4 petgs                     1.70   d & k
    5 xlr (metal to pet gs)     1.00   southwall   plasma treated
    6 bemis                     2.00   bemis
    7 core pvc                 12.00   oberthur
    8 pvc laminate              1.60   oberthur    magnetics
Total                          33.90
    Construction #7 - seems to stick ok, best so far, scale up. Make sub-laminat   (aka - t)
    1 pvc laminate              1.60   oberthur
    2 core pvc                 12.00   oberthur
    3 w-35                      2.00   bemis
    4 petgs                     1.70   d & k
    5 xlr (metal to pet gs)     1.00   southwall   plasma treated
    6 w-35                      2.00   bemis
    7 core pvc                 12.00   oberthur    core to core = 14.2 lb.in.
    8 pvc laminate              1.60   oberthur    magnetics
Total                          33.90
    Construction #8 - sublaminate to be used with 12 mil pvc core
    1 w-35                      2.00
    2 petgs                     1.70
    3 xlr (metal to pet gs)     1.00
Total                           4.70
    Construction #9 - sublaminate to be used with 10 mil pvc core
    1 pvc laminate              1.60
    2 w-35                      2.00
    3 petgs                     1.70
    4 xlr (metal to pet gs)     1.00
    5 bemis                     2.00
    6 pvc laminate              1.60
Total                           9.90
    Construction #10 (if u works)
    1 w35                       2.00
    2 petgs                     1.70
    3 xlr (metal to pet gs)     1.00
    4 w35                       2.00
```

FIG. 11 continued

| | | |
|---|---|---|
| Total | 6.70 | |
| ir ink - printed core | | |
| 1 tm mixing clear | 0.80 | sericol |
| 2 vmca resin | 0.07 | union carbide |
| 3 cyclohexanone | 0.10 | aldrich |
| 4 epolight vii-164 | 0.03 | epolin |
| Total | 1.00 | |
| ir ink #2 | | |
| 1 vinyl vmca resin | 0.55 | union carbide |
| 2 eep solvent | 0.35 | eastman kodak |
| 3 cyclohexanone | 0.05 | aldrich |
| 4 epolight vii-164 | 0.03 | epolin |
| 5 epolight vi-30 | 0.02 | epolin |
| Total | 1.00 | |
| ir ink #3 | | |
| 1 tm mixing clear | 0.90 | sericol |
| 2 cyclohexanone | 0.03 | aldrich |
| 3 epolight vii-164 | 0.03 | epolin |
| 4 epolight vi-30 | 0.02 | epolin |
| 5 epolight 6084 | 0.02 | epolin |
| Total | 1.00 | |

FIG. 13

Green Card Measurements

| Wavelength | Transmission Density | ATM Readability | ISO Compliant |
|---|---|---|---|
| 400 to 470 | 1.5 to 2.4 | Yes | Yes |
| 470 to 640 | 1.3 to 0.9 | Yes | No |
| 640 to 780 | 1.3 to 2.5 | Yes | Yes |
| 780 to 800 | 1.3 to 1.2 | Yes | Borderline |
| 800 to 1000 | 1.3 to 2.6 | Yes | Yes |

FIG. 14

Green RCP ATM Test Results

| ATM Manufacturer | Equipment Type | Notes | Global Platform | Pass/Fail |
|---|---|---|---|---|
| NCR Corporation | 15 NCR ATMs 6 Diebold ATMs | Diagnostic and Application tested | Yes | Pass |
| Diebold | 202 and 861 (Universal) Series and Kyoto series (made by Omron) | Diebold require opacity of greater than 1.3 from 700nm plus for acceptance in all Diebold machines | Yes | Pass |
| Fujitsu | 5 ATMs with motorized track, motorized track 2 and dip readers | ATM configuration included card reader firmware for card detection. | Yes (except Japan) | Pass |

FIG. 15

INFRARED BLOCKING ARTICLE

CROSS-REFERENCE TO RELATED APPLICATIONS

The present application claims the benefit of and is a Continuation of U.S. patent application No. 11/879,468, filed Jul. 17, 2007. The '468 Application is a Continuation-in-Part Application of U.S. patent application No. 10/394,914, filed Mar. 21, 2003, which is a Continuation Application of U.S. patent application No. 10/092,681, filed Mar. 7, 2002, which is a continuation-in-part application of U.S. patent application No. 10/062,106, filed Jan. 31, 2002, which is a continuation-in-part application of U.S. patent application No. 09/653,837, filed Sep. 1, 2000 and further claims the benefit of U.S. Provisional Application No. 60/153,112, filed Sep. 7, 1999; U.S. Provisional Application No. 60/160,519, filed Oct. 20, 1999; U.S. Provisional Application No. 60/167,405, filed Nov. 24, 1999; and U.S. Provisional Patent Application No. 60/171,689, filed Dec. 21, 1999. All these aforementioned applications are hereby incorporated by reference herein.

BACKGROUND OF THE INVENTION

The present invention relates generally to a transaction card, and more particularly, to the fabrication and use of an optically recognizable transparent or translucent transaction card that may contain a hologram, magnetic stripe or integrated circuit as well as other transaction card constituents.

The proliferation of transaction cards, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tempering. Thus, the initial cards merely served as devices to provide data to merchants and the only security associated with the card was the comparison of the cardholder's signature on the card to the cardholder's signature on a receipt along with the embossed cardholder name on the card. However, many merchants often forget to verify the signature on the receipt with the signature on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards included not only demographic and account information, but the transaction cards also include graphic images, designs, photographs and security features. A recent security feature is the incorporation of a diffraction grating, or holographic image, into the transaction card which appears to be three dimensional and which substantially restricts the ability to fraudulently copy or reproduce transaction cards because of the need for extremely complex systems and apparatus for producing holograms. A hologram is produced by interfering two or more beams of light, namely an object beam and reference beam, onto a photoemulsion to thereby record the interference pattern produced by the interfering beams of light. The object beam is a coherent beam reflected from, or transmitted through, the object to be recorded, such as a company logo, globe, character or animal. The reference beam is usually a coherent, collimated light beam with a spherical wave front. After recording the interference pattern, a similar wavelength reference beam is used to produce a holographic image by reconstructing the image from the interference pattern.

However, in typical situations, a similar laser beam is not available to reconstruct the image from the interference pattern on the card. As such, the hologram should be able to be viewed with ordinary, white light. Thus, when a hologram is recorded onto a transaction card, the image to be recorded is placed near the surface of the substrate to allow the resulting hologram to be visible in ordinary, white light. These holograms are known as reflective surface holograms or rainbow holograms. A reflective hologram can be mass-produced on metallic foil and subsequently stamped onto transaction cards. Moreover, the incorporation of holograms onto transaction cards provides a more reliable method of determining the authenticity of the transaction card in ordinary white light, namely by observing if the hologram has the illusion of depth and changing colors.

Administrative and security issues, such as charges, credits, merchant settlement, fraud, reimbursements, etc., have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allows digitized data to be stored in machine readable form. As such, magnetic stripe reader are used in conjunction with magnetic stripe cards to communicate purchase data received from a cash register device on-line to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which could be incorporated into transaction cards. These integrated circuit (IC) cards, known as smart cards, proved to be very reliable in a variety of industries due to their advanced security and flexibility for future applications.

As magnetic stripe cards and smart cards developed, the market demanded international standards for the cards. The card's physical dimensions, features and embossing area were standardized under the International Standards Organization ("ISO"), ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch stripe located either in the front or rear surface of the card which is divided into three longitudinal parallel tracks. The first and second tracks hold read-only information with room for 79 alpha numeric characters and 40 numeric characters, respectively. The third track is reserved for financial transactions and includes enciphered versions of the user's personal identification number, country code, currency units, amount authorized per cycle, subsidiary accounts, and restrictions. More information regarding the features and specifications of transaction cards can be found in, for example, Smart Cards by Jose Luis Zoreda and Jose Manuel Oton, 1994;Smart Card Handbook by W. Rankl and W. Effing, 1997, and the various ISO standards for transaction cards available from ANSI (American National Standards Institute), 11 West 42nd Street, New York, N.Y. 10036, the entire contents of all of these publications are herein incorporated by reference.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices. With respect to ATMs, the total number of ATM devices shipped in 1999 is 179,274 (based on Nilson Reports data) including the ATMs shipped by the top ATM manufacturers, namely NCR (138-18 231st Street, Laurelton, N.Y. 11413), Diebold (5995 Mayfair, North Canton, Ohio 44720-8077), Fujitsu (11085 N. Torrey Pines Road, La Jolla, Calif. 92037), Omron (Japan), OKI (Japan) and Triton.

Many of the card acceptance devices require that the transaction card be inserted into the device such that the device can appropriately align its reading head with the relevant component of the transaction card. Particularly, many ATMs require that a transaction card be substantially inserted into a slot in the ATM. After insertion of the card into the slot, the ATM may have an additional mechanical device for further retracting the transaction card into the ATM slot. To activate the ATM, the ATM typically includes a sensor, such as a phototransistor and a light emitting diode (LED), which emits light onto a card surface and the phototransistor receives light from the LED. A card blocks the infrared radiation from the phototransistor, therefore indicating that a card has been detected. A typical LED in an ATM is an IRED (infrared emitting diode) source having a wavelength in the range of about 820-920 nm or 900-1000 nm (see FIG. 5), which is not present in ambient light at the levels needed by a phototransistor sensor. The spectral sensitivity curve of the typical phototransistor is in the range of about 400 nm -1100 nm (see FIG. 6). However, the visible spectrum is about 400 nm-700 nm, and the spectral sensitivity of the phototransistor is about 60% at 950 nm and 90% at 840 nm. Thus, visible light is not part of the analog-to-digital algorithm. Moreover, ISO 7810, clause 8.10 requires that all machine readable cards have an optical transmission density from 450 nm-950 nm, greater than 1.3 (less than 5% transmission) and from 950 nm-1000 nm, greater than 1.1 (less than 7.9% transmission).

For the card to be detected by the ATM, the light is typically blocked by the card body. Moreover, the amount of light necessary to be blocked by a card is related to the voltage data received from the analog to digital conversion. The voltage range of the sensor is typically in a range of about 1.5V to 4.5V. When a card is inserted into a sensor, the voltage drops to less than 1.5V indicating the presence of a card in the transport system. After the card is detected by the phototransistor, the magnetic stripe reader scans the magnetic stripe and acquires the information recorded on the magnetic stripe. A manufacturer of the LED sensor device in an ATM is, for example, Omron and Sankyo-Seiki of Japan, 4800 Great America Parkway, Suite 201, Santa Clara, Calif. 95054.

As previously mentioned, transaction cards and readers typically follow various ISO standards which specifically set forth the location of card data and compounds. However, because numerous companies produce different versions of ATMs, the location of the sensor within the ATM is not subject to standardization requirements. In the past, the varying locations of the sensor within the ATM did not affect the ability of the ATM to sense the transaction card because the transaction card included a substantially opaque surface, such that any portion of the opaque transaction card could interrupt the IRED emission and activate the insert phototransistor. However, more recently, to provide a unique image, and to meet consumer demand, companies have attempted to develop transparent or translucent transaction cards. The use of a transparent card would often not activate the insert phototransistor because the IRED emission would not sufficiently reflect off of a transparent surface, so the radiation would simply travel through the card and become detected by the phototransistor. The machine, therefore, could not detect the presence of the card, and often jammed the equipment.

In an attempt to solve this problem, companies have printed opaque areas onto transparent cards in an effort to provide an opaque area to activate the input sensors on ATMs. However, due to the aforementioned variations in the location of the sensor in many ATMs, the use of limited opaque areas on a transparent card did not allow the card to activate the sensor in a sufficient number of ATMs. Alternatively, companies attempted to incorporate a lens onto a transaction card in an effort to redirect the LED light. However, during the card manufacture process, which often involves substantial pressure and heat, the lensing surface would be disrupted or destroyed. As such, a need exists for a transparent or translucent transaction card which is capable of activating an input sensor, wherein the input sensor may interface the card in a variety of locations.

Furthermore, during the card fabrication process, the cards must be detected on the assembly line in order to accurately count the number of cards produced during a predetermined time interval. To count the cards, typical card fabrication assembly lines include counters with LED sensors, similar to the ATM sensors, which count the cards based upon the reflection of the LED light beam off of the opaque card surface. The production of transparent transaction cards suffers from similar limitations as ATM devices in that the LED beam does not reflect or is not sufficiently absorbed from a transparent surface. Thus, a transparent card is needed that can be produced on existing assembly lines. Similar problems exist when cards are punched to final dimensions.

Although existing systems may allow for the identification and detection of articles, most contain a number of drawbacks. For example, identification features based on UV, visible light detection, etc. are sometimes difficult to view, often require certain lighting requirements and typically depend on the distance between the article and the detection device. Additionally, the use of certain types of plastic, paper or other material which contain the identification mark may be limited by the particular identification device. For example, opaque materials typically deactivate the phototransistors in ATM's by blocking light in both the visible (near IR) and far IR light regions. Furthermore, the incorporation of a detection or authentication feature into a card product requires a separate material or process step during the card fabrication process. The incorporation of a new material or process step often requires expensive modifications to current equipment or new equipment and often extends the time for fabricating the card product.

SUMMARY OF THE INVENTION

The present invention relates to a process for producing a transparent or translucent transaction card having any one or more features, such as a holographic foil, integrated circuit chip, silver magnetic stripe with text on the magnetic stripe, opacity gradient, an optically recognizable ink or film contained within the construction of the card, a translucent signature field such that the signature on back of the card is visible from the front of the card and an "active thru" date on the front of the card. The card is optically recognizable due to an invisible or transparent infrared ink or film which is distributed over the card's surface, thereby allowing the card to block (absorb, refract, diffuse and/or reflect) infrared light and transmit all other light. Particularly, when the transaction card is inserted into an ATM device, the light beam from the IRED is blocked by the infrared ink or film, thereby deactivating the phototransistor. Moreover, during the manufacturer of transaction cards, the optically recognizable card allows an IRED light beam from a personalization device, inspection unit or counter device to count the number of transaction cards produced in an assembly line.

BRIEF DESCRIPTION OF THE DRAWINGS

A more complete understanding of the present invention may be derived by referring to the detailed description and claims when considered in connection with the following illustrative figures, which may not be to scale. In the following figures, like reference numbers or steps refer to similar compounds throughout the figures.

FIGS. 7A-7I show various embodiments of card layers in accordance with an exemplary embodiment of the present invention;

FIG. 11 shows exemplary embodiments of layers for card construction in accordance with an exemplary embodiment of the present invention;

FIG. 13 shows exemplary IR ink ingredients which exhibit a green color in accordance with an exemplary embodiment of the present invention;

FIG. 14 shows measurements related to these exemplary green cards in accordance with an exemplary embodiment of the present invention;

FIG. 15 shows exemplary ATM test results for the exemplary green cards in accordance with an exemplary embodiment of the present invention;

DETAILED DESCRIPTION

Figure 1:
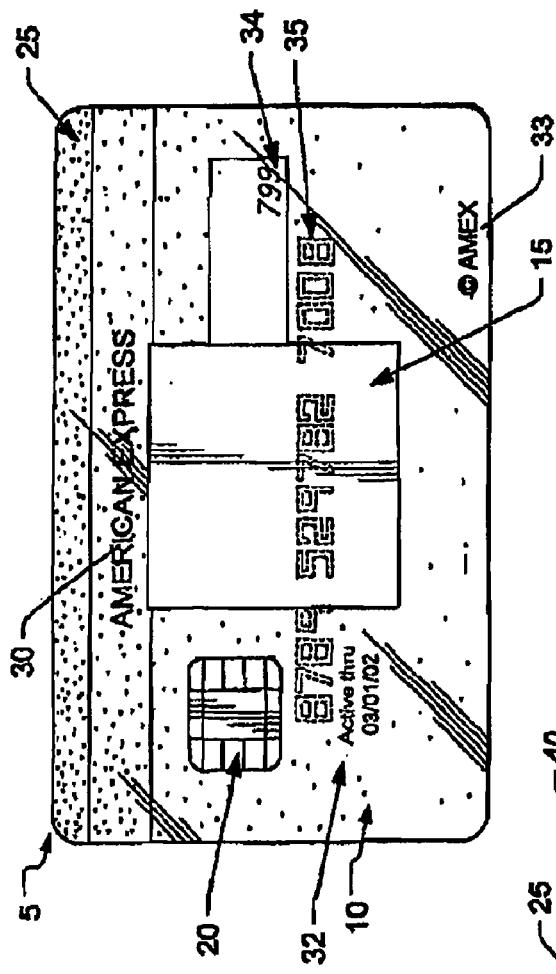
FIG. 1 is a front view of an exemplary transaction card in accordance with an exemplary embodiment of the present invention.

In general, the present invention allows for the identification and detection of various articles, wherein the articles include materials having machine recognizable compounds. The articles include, for example, transaction cards, documents, papers and/or the like. The materials include, for example, coatings, films, threads, plastics, inks, fibers, paper, planchettes, and/or the like.

In an exemplary embodiment, the machine recognizable compounds are optically recognizable compounds containing infrared blocking (absorbing, refracting, diffusing, reflecting or otherwise blocking) ingredients. The optically recognizable compounds may be invisible, visible, or colored to produce a desired effect and/or they may contain other detectable compounds, such as, for example, UV-Fluorescent or IR-Fluorescent features. The optical compounds preferably have good stability, resistance properties, durability and other physical properties, such as good appearance, flexibility, hardness, solvent resistance, water resistance, corrosion resistance and exterior stability. Moreover, the use of such compounds typically does not interfere with UV compounds that may be present in many substrates. One skilled in the art will appreciate that the optically recognizable compound is any chemical, solution, dye, ink substrate, material and/or the like which is recognizable by a sensor. In an exemplary embodiment, the optically recognizable ink is an infrared ink which blocks, absorbs or reflects most infrared light, but transmits most other wavelengths of light.

In an exemplary embodiment, the optically recognizable compound is incorporated into a material in the form of a film, plastic, fiber, ink, concentrate, thermoplastic or thermoset matrix, thread, planchette, and/or other medium which contains in the range of about 0.001 to 40.0 wt. (%) of a compound derived from organic or inorganic materials. The infrared ink may be applied to card 5 (see FIG. 1) by, for example, a screen printing process or any other printing or coating means such as lithography, gravure, flexo, calender coating, curtain coating, roller coating and/or the like. An exemplary screen printing process utilizes a screen press equipped with drying equipment (UV curable or convection heat) and a screen with a specific mesh size of about 80 lines/cm. The IR ink is printed across any portion of the entire card surface of plastic using a silk screen press, as described below.

Because the relative eye sensitivity of an ordinary observer for a specified level of illumination is between around 400-770 nm, infrared ink at over 770 nm is preferable because it is invisible to the human eye in normal white light. As such, the invisible infrared material will not substantially obscure the transparent surface of card 5. Additionally, the exemplary ink withstands card production temperatures of about 200 F to 400 F degrees and includes a "light fastness period" (which is the resistance of the ink to fade or degrade in the presence of any light, and specifically, UV light) of about at least three years under normal credit card usage conditions. Moreover, the exemplary ink blocks, absorbs or reflects the spectral output of IRED's, such as, for example, the Sankyo Seiki LED's, which is about 800-1000 nm. The exemplary ink also limits the light reaching the phototransistors, so the presence of a clear card having the ink is detected in a transaction machine, such as, for example, a card grabbing-type ATM machine.

Exemplary compositions of the machine recognizable compounds of the present invention comprise a mixture of a wide variety of compounds. The active compounds are derived of inorganic, organometallic, ore organic layered materials or rare earth compounds, most commonly rare earth oxides, oxysulfides or oxyhalides. The compounds are relatively inert, so the effects on the performance properties of the final product are minimized. The infrared compound comprises either a dye, layered material, pigment and/or encapsulated pigment that is dispersed in a particular medium which can be incorporated in a wide variety of end-usable products. The particle size of the infrared compound allows the materials (plastic, thread, ink, etc.) to optimally dispersed or dissolved and uniformly exist within the articles which it is incorporated.

Conventionally known infrared materials comprising layered dielectric and metallic materials or doped rare-earth materials can be effectively used as pigments for compounds in accordance with exemplary embodiments of the present invention. In this context, the pigments or dyes absorb specific wavelengths of energy and may change one wavelength of energy to another. The energy conversions or absorptions may be above or below any stimulation within the electromagnetic spectrum. The compounds may absorb specific wavelengths of light or change from one color to another or the compounds may change from invisible to visible and/or the like. The infrared compounds of the present invention are thus incorporated into a system which reversibly changes one wavelength of energy to another, hence causing a "fingerprint"-type of detectable feature within the articles.

Moreover, the prepared films or materials can be mixed with a binder to form infrared compounds for use in threads, fibers, coatings, and the like. Binders that can be incorporated in the present invention include conventional additives such as waxes, thermoplastic resins, thermoset resins, rubbers, natural resins or synthetic resins. Such examples of such binders are, polypropylene, nylon, polyester, ethylene-vinyl acetate copolymer, polyvinyl acetate, polyethylene, chlorinated rubber, acrylic, epoxy, butadiene-nitrile, shellac, zein, cellulose, polyurethane, polyvinylbutyrate, vinyl chloride, silicone, polyvinyl alcohol, polyvinyl methyl ether, nitrocellulose, polyamide, bismaleimide, polyimide, epoxy-polyester hybrid and/or the like. Films that can be used include polyester, polyvinylchloride, polypropylene, polyethylene, acrylic, polycarbonate and/or the like. As discussed below, any film can be laminated or adhered to common card articles using heat, adhesives, or a combination of both.

If the content of the compound is too low, adequate blocking may not be achieved and the phototransistor may not send the proper signal to the capture device, which will mean that the card will not be detected. Therefore, the infrared compounds are usually present in the composition at a total amount from about 1 PPM to 80.0 wt. (%), and preferably from about 0.25%-25.0% by weight. Moreover, the present invention contemplates that other materials such as, for example, UV absorbers, reflectors, antioxidants, and/or optical brighteners, may be add in order to achieve better resistance properties, aesthetics, or longevity of the materials.

Particularly, other materials may be added to allow for color shifts from one color to another color after stimulation. Commonly employed materials such as dyes, pigments, fluorescent dyes, luminous pigments, and/or the like, can be used to promote reversible color changes from one color state to another color state. Such materials can be incorporated directly with the infrared compounds during initial processing or may be added after the infrared compounds have been processed. The use of materials such as solvents, water, glycols, and/or the like can be added to adjust rhelogical properties of the material. Also, the use of surfactants, defoamers, release agents, adhesion promoters, leveling agents, and/or the like may be added to the formulations for improved processing properties. Optical brightening materials may also be added to ensure whiteness in a colorless state and to maintain a low level of contrast between many substrates where infrared compounds are located.

Fibers of various materials are used either in a continuous manner or single fibers can be incorporated into a wide variety of materials. The present invention contemplates, for example, natural fibers, synthetic fibers, copolymer fibers, chemical fibers, metal fibers, and/or the like. Examples of these fibers may be nylon, polyester, cotton, wool, silk, casein fiber, protein fiber, acetalyated staple, ethyl cellulose, polyvinylidene chloride, polyurethane, acetate, polyvinyl alcohol, triacetate, glass, wood, rock wool, carbon, inorganic fibers, and/or the like. Such fibers can be incorporated or mixed into other types of materials such as paper pulp, plastic label stock, plastic materials, and the like. Such materials can be used alone in a continuous manner or can be used as mono- or di-filaments in other materials.

Moreover, the infrared materials that are incorporated into plastics can be used with a wide variety of materials, such as, for example, nylon, acrylic, epoxy, polyester, bismaleimide, polyamide, polyimide, styrene, silicone, vinyl, ABS, polycarbonate, nitrile, and/or the like. As such, the compounds that are incorporated into fibers, plastics, film and/or the like, may be processed directly to a suitable form in a single- or multi-process application. Such compounds can be added into a formulation in the form of a single ingredient or in the form of a master-batch that is then processed in a similar manner to normal processing operations of compounds. Processing of such compounds includes the use of continuous mixers, twoor three-roll mills, extrusion, and/or other melt-compounding methods of dispersion. While in an exemplary embodiment, the thread can be woven or non-woven, the infrared materials may be extruded directly into a thermoplastic matrix and drawn directly into the form of a thread that can be used in a continuous manner or sectioned in the form of a fiber or plastic film.

The exemplary infrared compounds are deposited onto films of various compositions and can be used in most card applications. Moreover, the infrared compounds in accordance with the present invention can be used alone or blended with other materials at ranges from 0.001 to 50.0 parts by weight, but most preferable from 1.0 to 15.0 parts by weight.

A particularly preferred infrared compound is a multilayer polymeric film manufactured by 3M Company (Minneapolis, Minn.), and described in U.S. Pat. No. 5,882,774 entitled "Optical Film", U.S. Pat. No. 6,045,894 entitled "Clear to Colored Security Film", and U.S. Pat. No. 6,049,419 entitled "Multilayer Infrared Reflecting Optical Body", each of which is incorporated herein by reference in their entireties. Specifically, the multilayer polymeric film is either a birefringent dielectric multilayer film or an isotropic dielectric multilayer film designed to reflect infrared radiation, i.e., electromagnetic radiation commonly known to have a wavelength longer than visible light, specifically above about 700 nm.

The particularly preferred film utilized in the present invention comprises at least two layers and is a dielectric optical film having alternating layers of a material having a high index of refraction and a material having a low index of refraction. Although the film may be either birefringent or isoptropic, it is preferably birefringent, and is designed to allow the construction of multilayer stacks for which the Brewster angle is very large or is nonexistent for the polymer layer interfaces. This feature allows for the construction of multilayer mirrors and polarizers whose reflectivity for p-polarized light decreases slowly with angle of incidence, is independent of angle of incidence, or increases with angle of incidence away from the normal. As a result, the multilayer films have high reflectivity over a wide bandwidth.

Specific examples of such films are described in U.S. patent Ser. No. 08/402,201, filed Mar. 10, 1995, and U.S. patent Ser. No. 09/006,601 entitled "Modified Copolyesters and Improved Multilayer Reflective Film", filed on Jan. 13, 1998. In addition, U.S. Pat. No. RE 3,034,605 describes films which prevent higher order harmonics that prevent color in the visible region of the spectrum. Other suitable films include the films described in U.S. Pat. No. 5,360,659, which describes a two component film having a six layer alternating repeating unit that suppresses reflections in the visible spectrum (about 380 nm to about 770 nm) while reflecting light in the infrared wavelength region of between about 770 nm to about 2000 nm.

Multilayer polymeric films can include hundreds or thousands of thin layers and may contain as many materials as there are layers in the stack. For ease of manufacturing, preferred multilayer films have only a few different materials. A preferred multilayer film, as noted above, includes alternating layers of a first polymeric material having a first index of refraction, and a second polymeric material of a second index of refraction that is different from that of the first material. The individual layers are typically on the order of about 0.05 μm to about 0.45 μm thick. Preferably, the number of individual layers in the optic film may preferably range from about 80 to about 1000 layers, although other numbers are contemplated in the present invention. In addition, the optical film may be as low as about 0.5 mil thick to as high as about 20.0 mils thick.

The multilayer films useful in the present invention may comprise alternating layers of crystalline naphthalene dicarboxylic acid polyester and another selected polymer, such as copolyester or copolycarbonate, wherein each of the layers have a thickness of less than about 0.5 μm. Specifically, polyethylene 2,6-naphthalate (PEN), polybutylene 2,6-naphthalate (PBN), or polyethylene terephthalate (PET) are typically used. Adjacent pairs of layers (one having a high index of refraction and the other a low index) preferably have a total optical thickness that is ½ of the wavelength of the light desired to be reflected. However, other ratios of the optical thicknesses within the layer pairs may be chosen as is apparent to one having ordinary skill in the art. A preferable optic film may be as low as about 0.5 mil having alternating layers of PET and polymethylmethacrylate (PMMA).

Although the optical film described above is particularly preferred, any other optical film may be utilized in the present invention that effectively absorbs, refracts, diffuses, reflects or otherwise blocks eletromagnetic radiation of a range or a plurality of ranges of wavelengths, but transmits electromagnetic radiation of another range or plurality of wavelengths, such as, for example, blocking the transmission of infrared radiation, but transmitting visible radiation, and the present invention should not be limited as herein described. Other suitable optical films may be utilized as apparent to one having ordinary skill in the art.

The present invention will now be illustrated in greater detail with reference to the following examples, comparative examples, test examples and use examples. As disclosed in the examples, tests and graphs herein, the resulting inks sufficiently block IR radiation from phototransistor detection. It is understood that the present invention is not limited thereto. For example, one skilled in the art will appreciate that, in any of the examples, the ink may contain other materials for different optical effects or authentication purposes.

EXAMPLE 1

The present example includes about 2% Epolin VII-164 dye and about 98% Tech Mark Mixing Clear, produced by Sericol, Inc. 980.0 g of Tech Mark solvent evaporative screen ink is mixed on a high-speed disperser. While mixing, 20.0 g of Epolight VII-164 dye is dissolved completely. The resulting ink has a viscosity of about 3.2 Pa·S at 25 C. degrees and is printed using a screen process. The screen process includes a 305 polymer screen onto both sides of clear PVC 13.0 mil film.

EXAMPLE 2

The following ink was produced by adding about 15.0 lbs of Epolight VII-164 and about 20.0 lbs of Epolight VI-30 to about 965 lbs. of TM Mixing Clear. The mixture was dispersed for about 40 minutes. The resulting mixture was coated on PVC core plastic using an 80 line/cm polyester screen. The resulting coating exhibited high absorbtivity from 780 nm to 1070 nm with low visible absorption. Card core, magnetic stripe and lamitate were assembled and the entire assembly was placed in Burckle Stack Lamination Unit at a temperature of about 280 F.

EXAMPLE 3

A concentrate of about 30.0 g. Epolight VII-172 was blended with about 700.0 g. of polyvinylchloride plastic. The resulting mixture was extruded at about 260 F, air cooled and pelletized. About 1.0 lb of the resulting pellets were combined with about 99.0 lbs of PVC. Klockner Pentaplast provided calendered sheets of approximately 0.013 inches. Cards were fabricated using said sheets. These cards exhibited sufficient absorption in the IR region from 800 nm to 1000 nm. The cards were detected by a Sankyo ATM capture device.

EXAMPLE 4

Multi-Layer PET plastic with sufficient optical properties was combined into a card construction. The PET plastic was provided by 3M Co. (Minneapolis, Minn.), as described above. The resultant card exhibited sufficient optics such that an ATM device detected the card.

ADDITIONAL EXAMPLES

Figure 16:
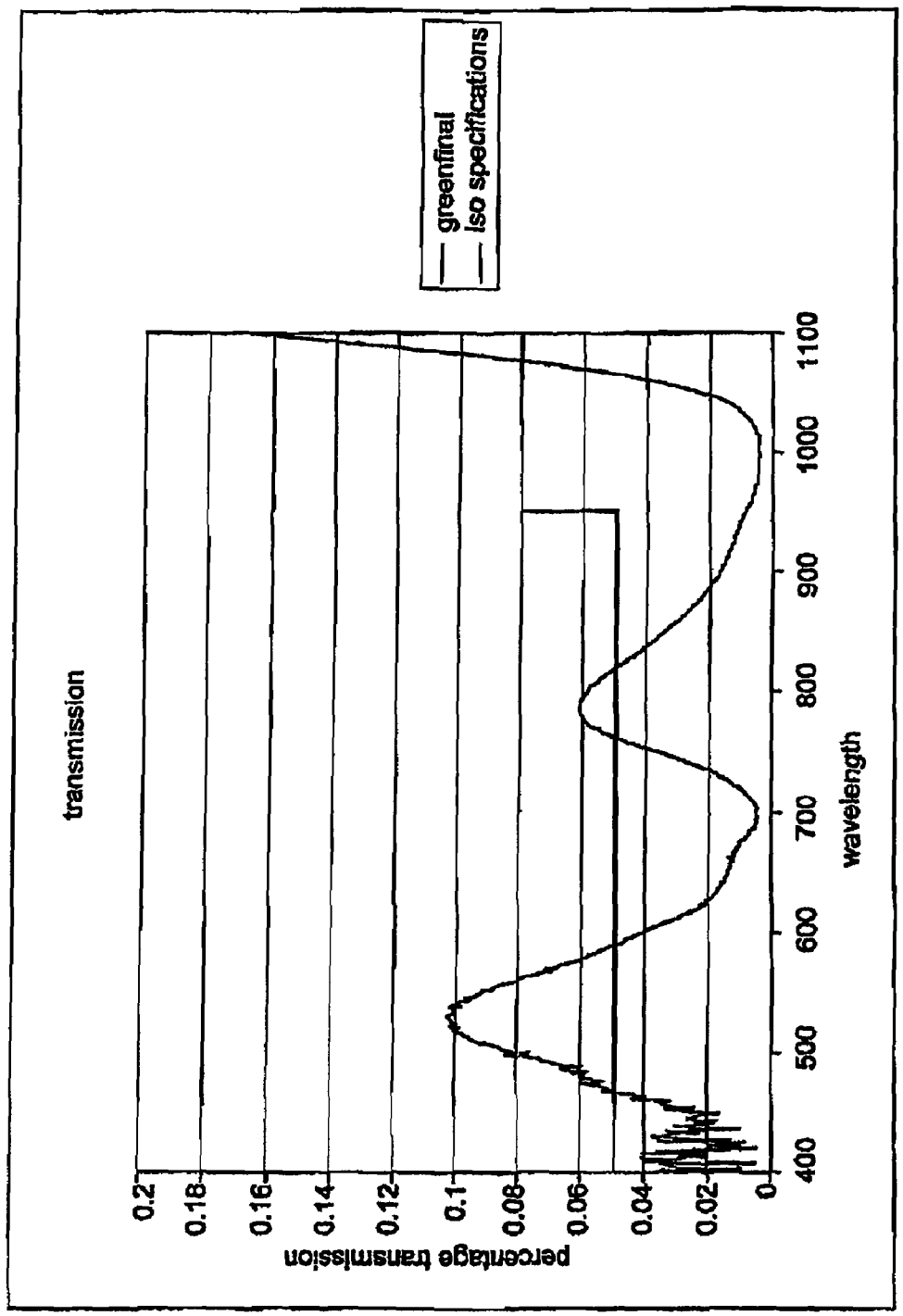
FIG. 16 shows an example of the transmission density of exemplary green cards in a graph of percent transmission v. wavelength in accordance with an exemplary embodiment of the present invention; and, FIGS. 17A-17I show exemplary test results for various card embodiments in a graph of percent transmission v. wavelength (nm) in accordance with an exemplary embodiment of the present invention.

Additional examples of IR ink formulations are disclosed in FIG. 13. The IR ink examples in FIG. 13 exhibit a visible green color. Moreover, FIG. 14 shows measurements related to these exemplary cards, including, for certain wavelength ranges, transmission density, ATM readability and ISO compliance. FIG. 15 shows exemplary test results for the exemplary green cards wherein samples of the cards were inserted into ATMs of various manufacturers. The tests resulted in a positive ATM detection of the exemplary cards. Furthermore, FIG. 16 shows an example of the transmission density of exemplary green cards in a graph of percent transmission v. wavelength (the graph also indicates the ISO specifications for the card).

Figure 17A:
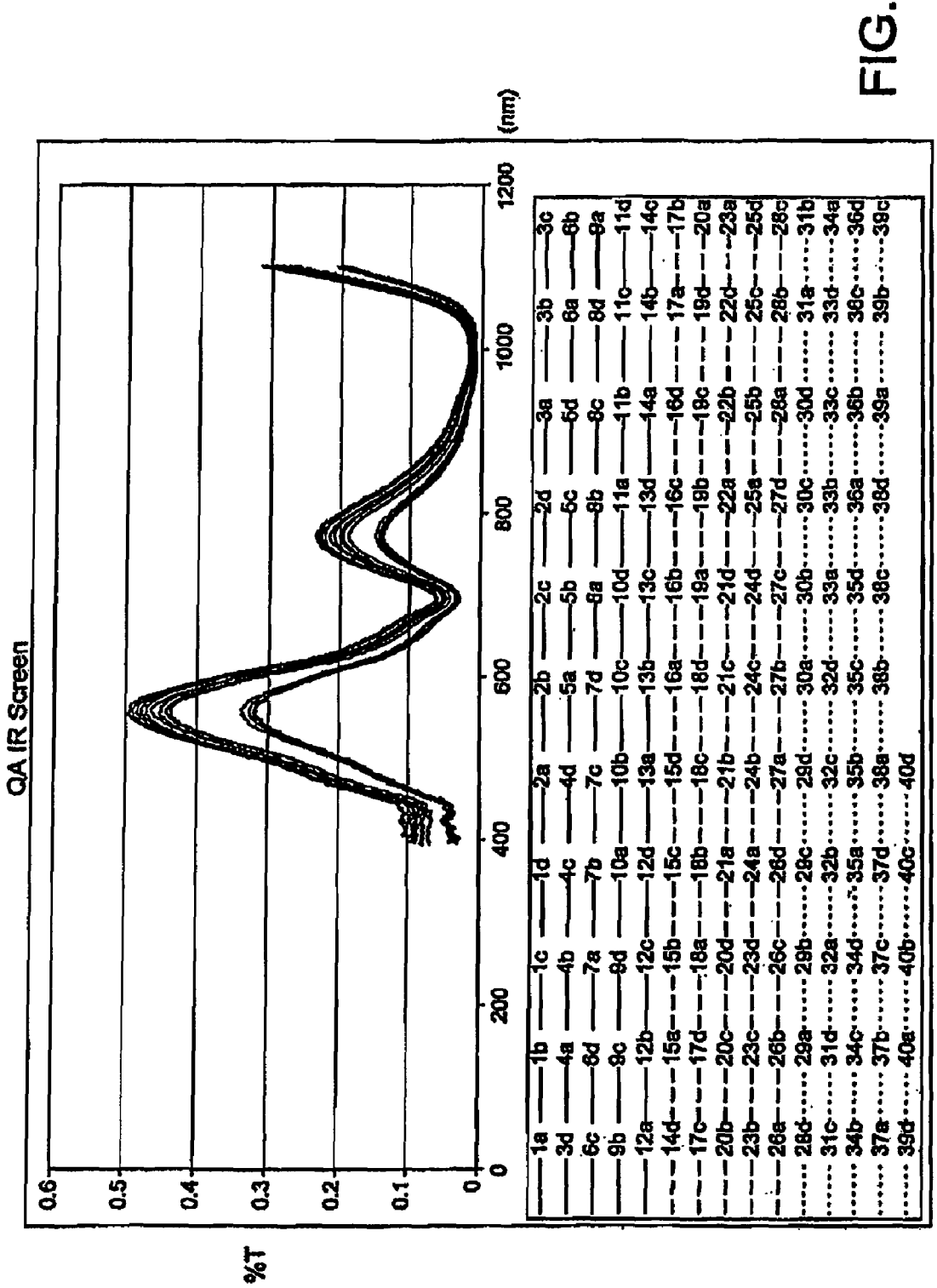
Figure 17B:
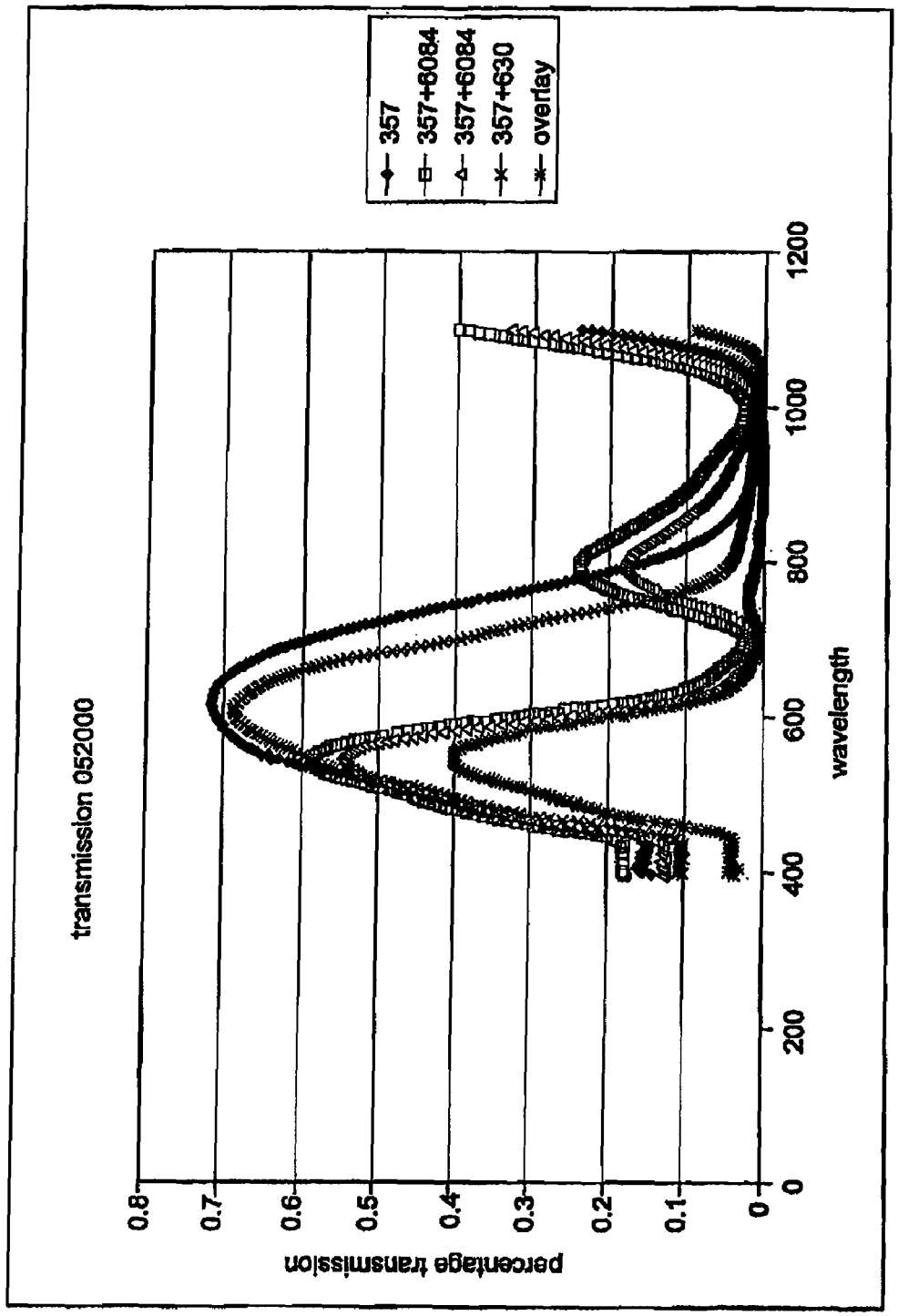
Figure 17C:
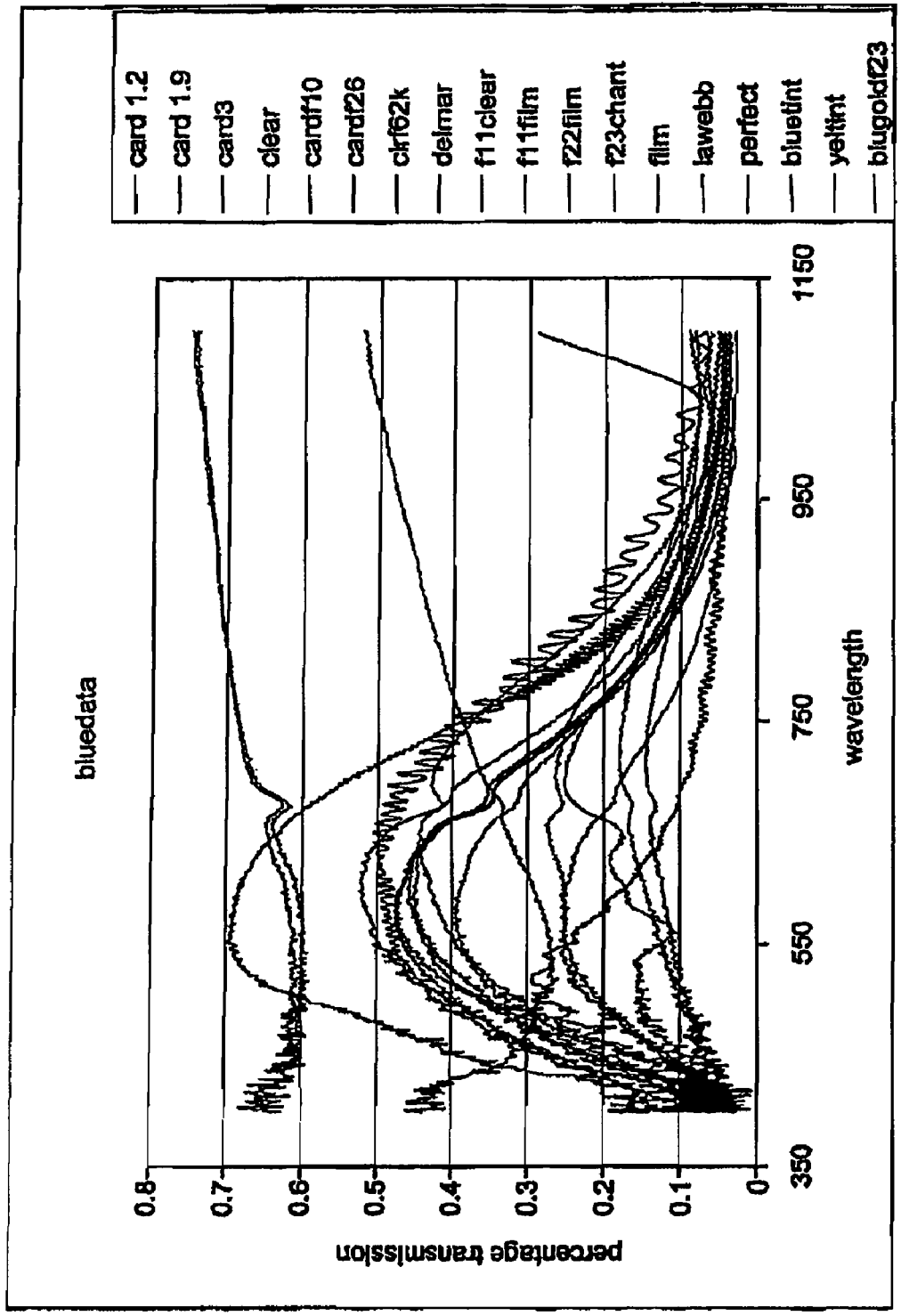
Figure 17D:
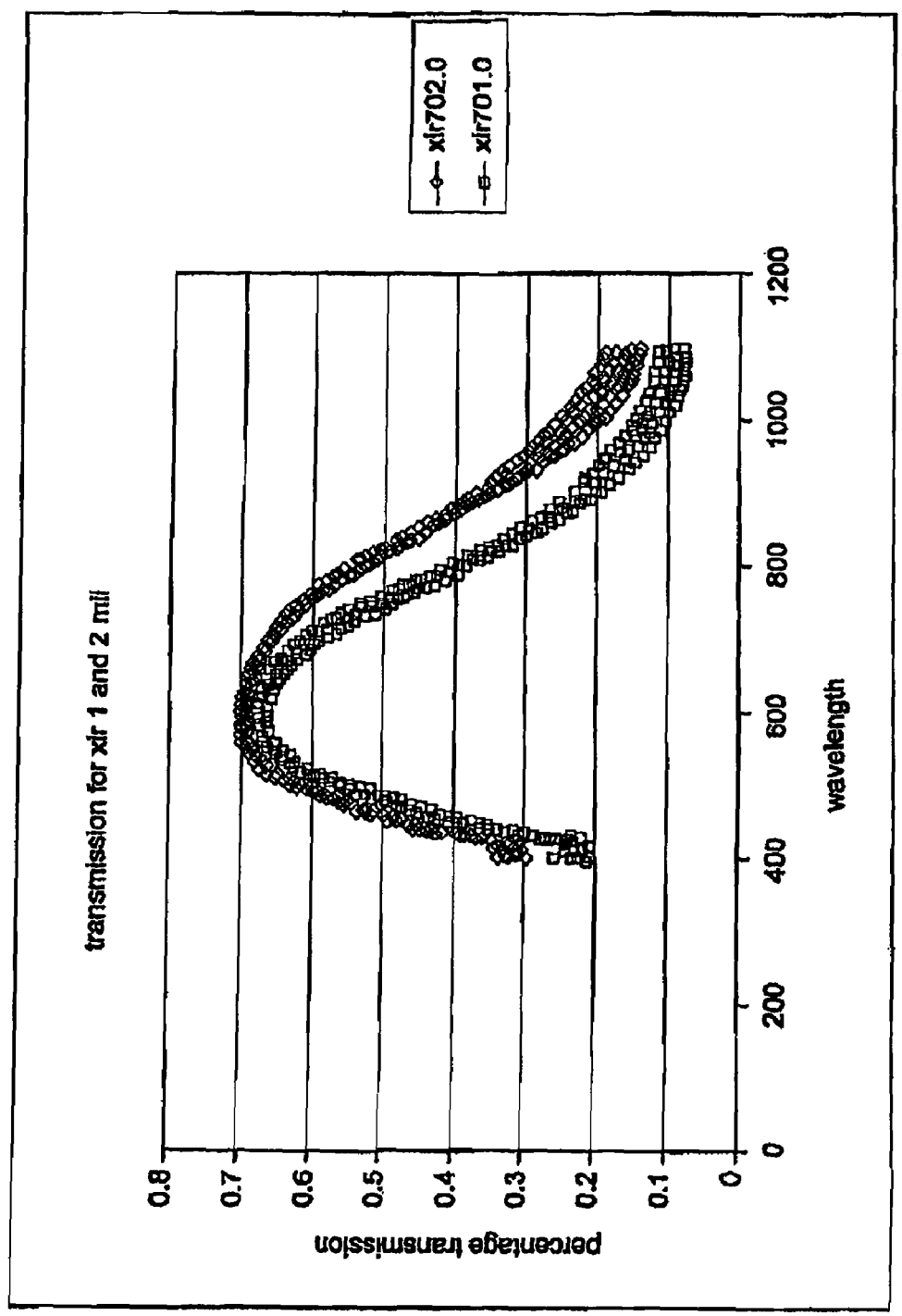
Figure 17E:
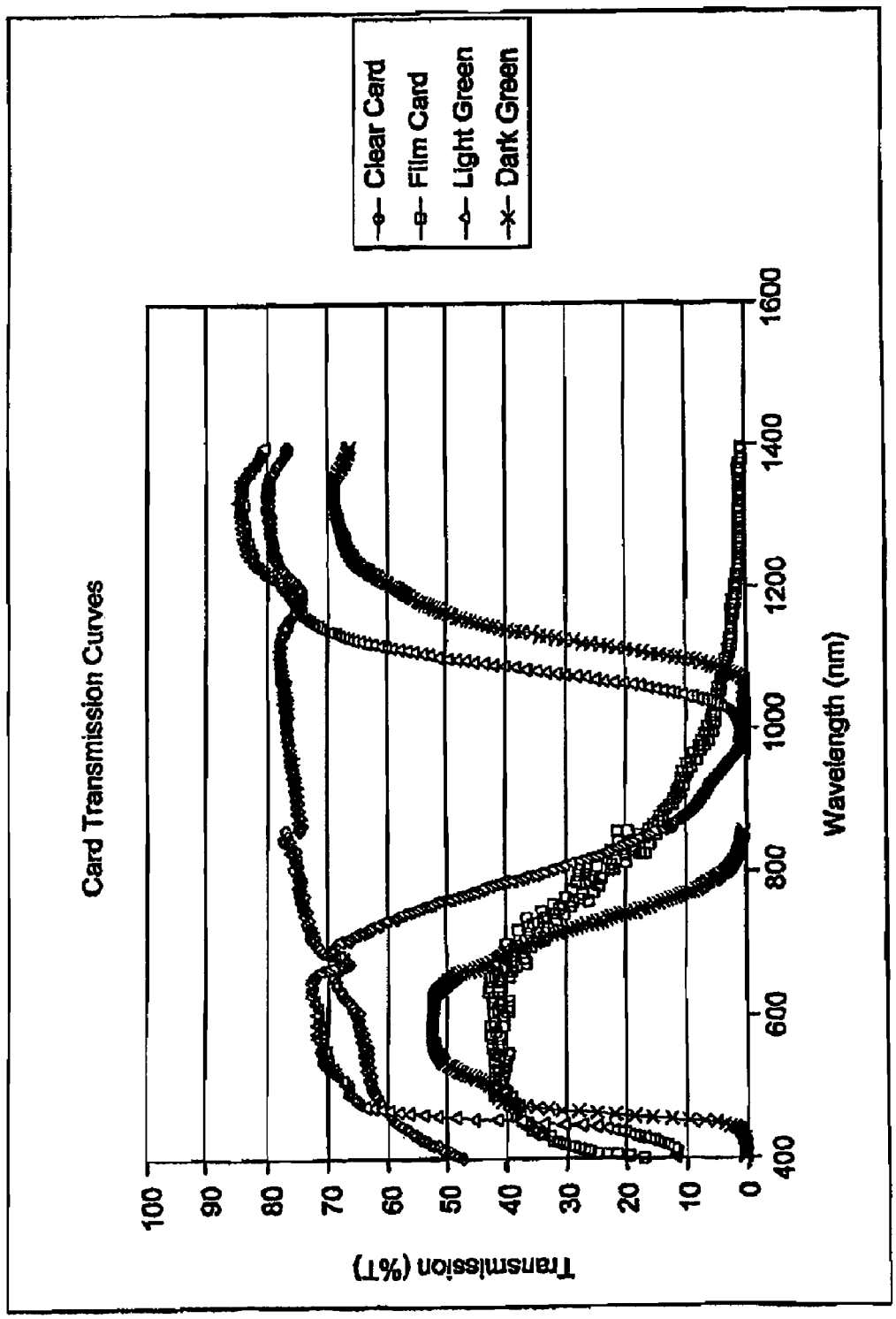
Figure 17F:
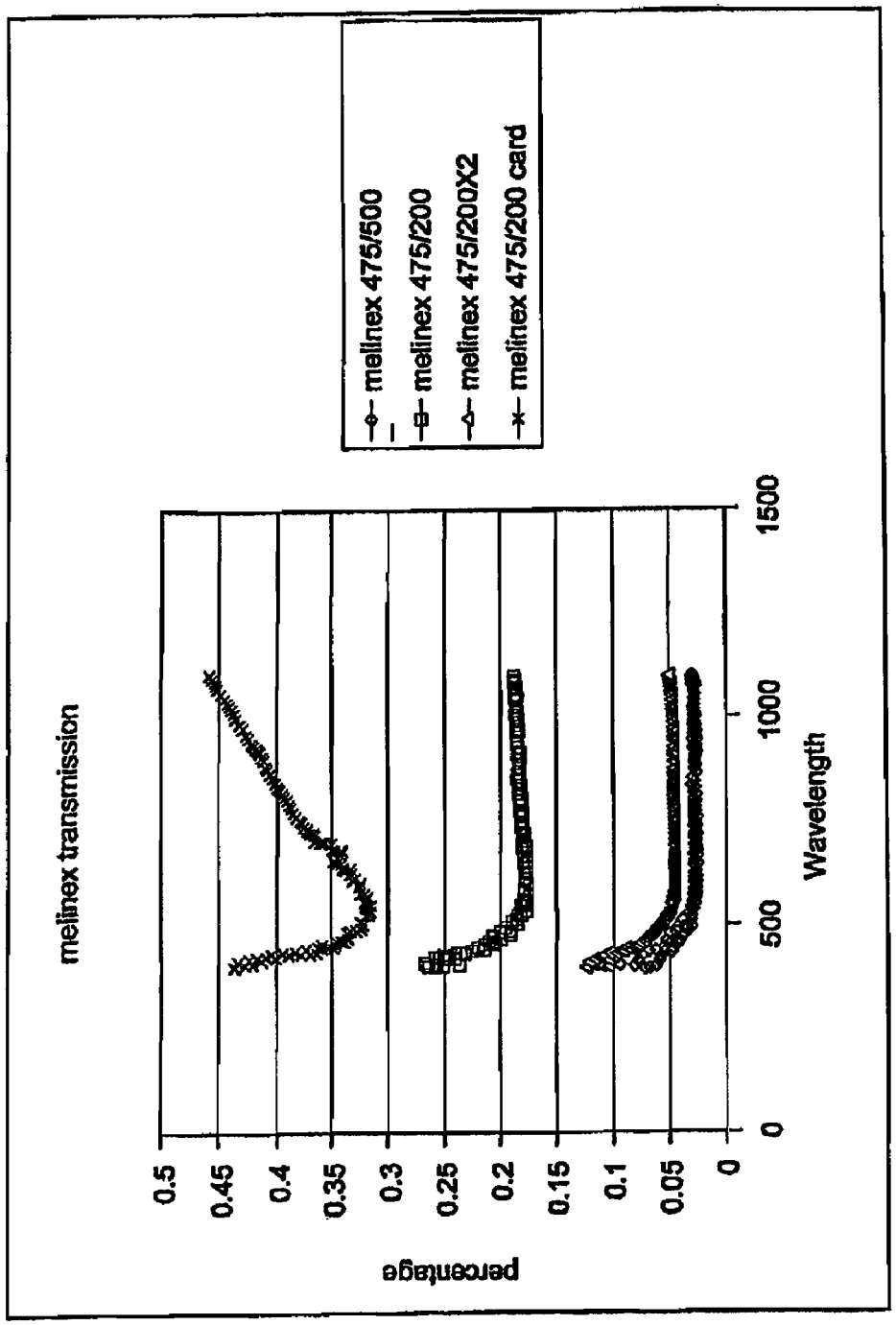
Figure 17G:
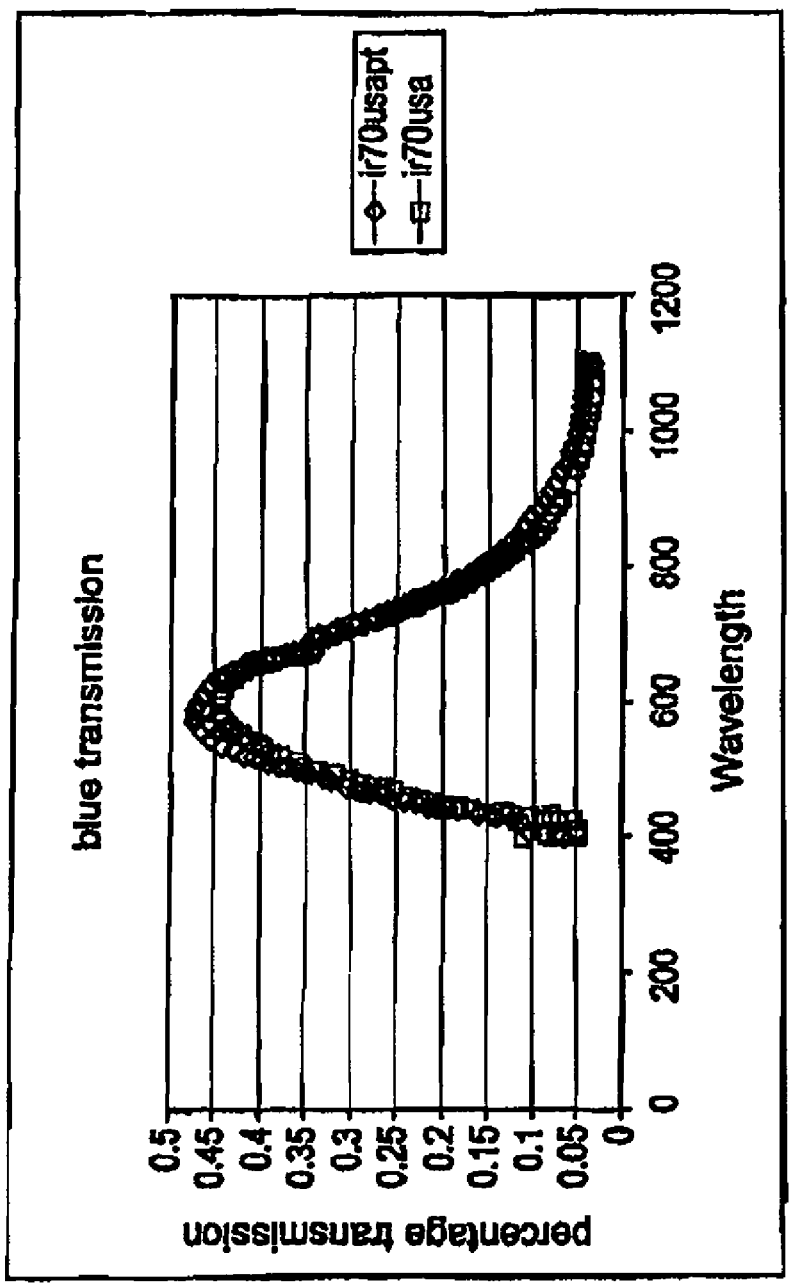
Figure 17H:
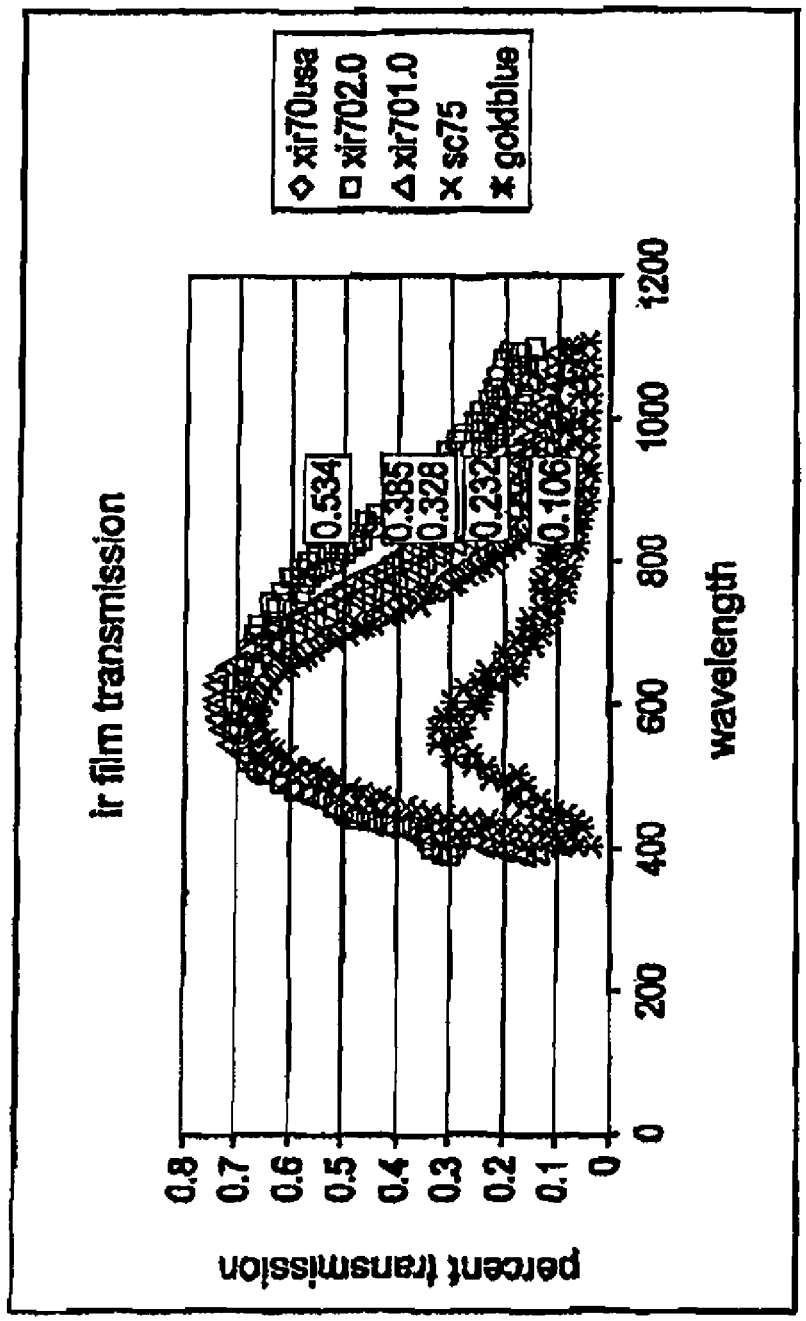
Figure 171:
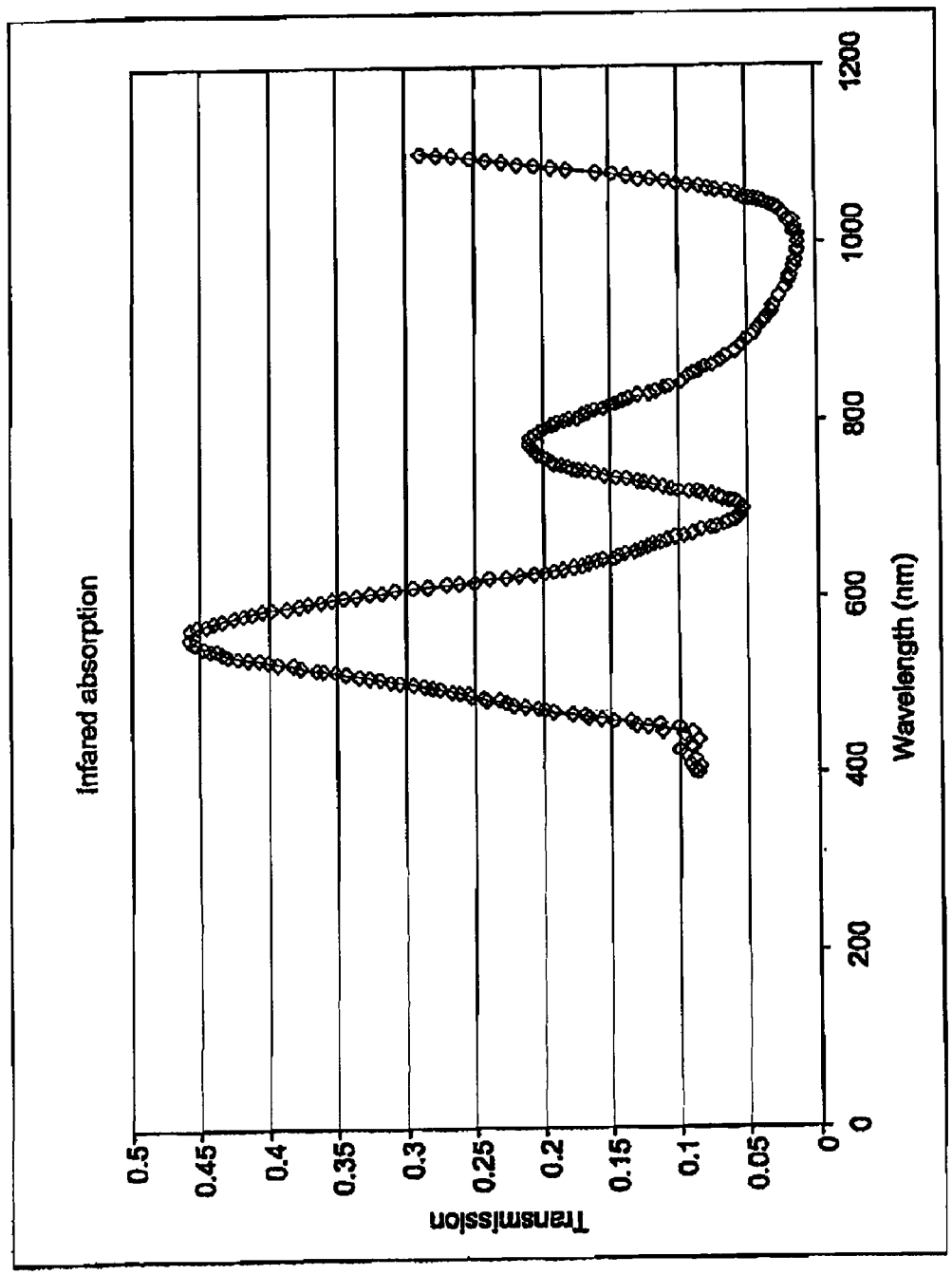

FIGS. 17A-17I show exemplary test results for various card embodiments in a graph of percent transmission v. wavelength (nm). For example, with respect to FIG. 17A, the quality assurance of IR ink on PVC with no text is tested wherein a curve represents one of four corners of an exemplary card. Subsequent curves represent another card sample which was selected after an interval of card production, such as, for example, after about 50 cards. FIG. 17B shows the percent transmission of different wavelengths of light through cards having different ink formulations, wherein each curve represents a card with a different ink formulation.

FIGS. 17C-17I represent various spectra of films, coatings, cards, etc. which demonstrate the ability of the materials used in the card constructions to block sufficient quantities of infrared radiation and transmit visible light in order to produce cards described in the embodiment. The mechanism of blocking may be absorption, reflection, diffusion, dispersion or other methods of blocking radiation in the electromagnetic spectrum.

Figure 4:
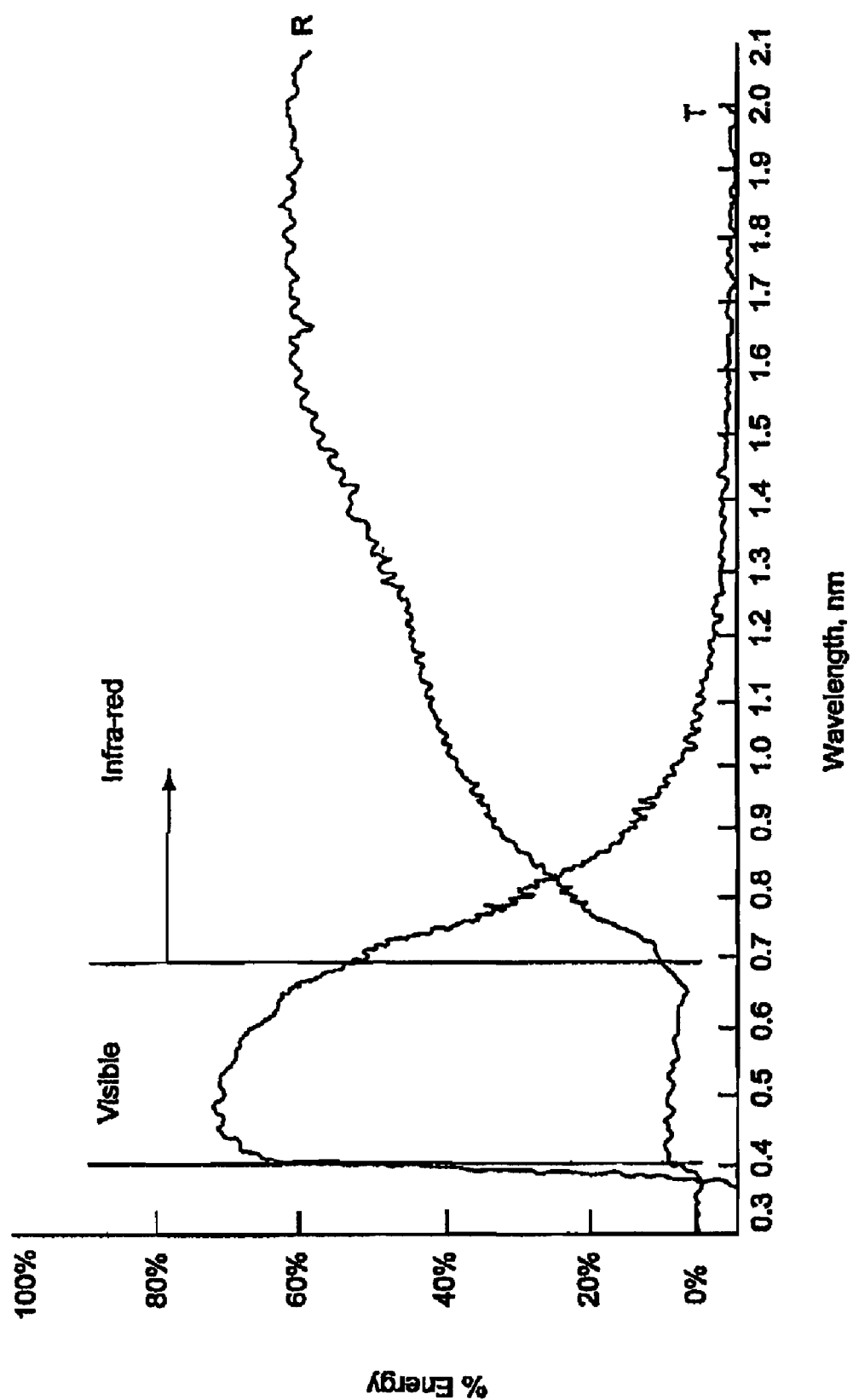
FIG. 4 is a graph of energy v. wavelength for the reflection and transmission of IR film in accordance with an exemplary embodiment of the present invention.
Figure 5:
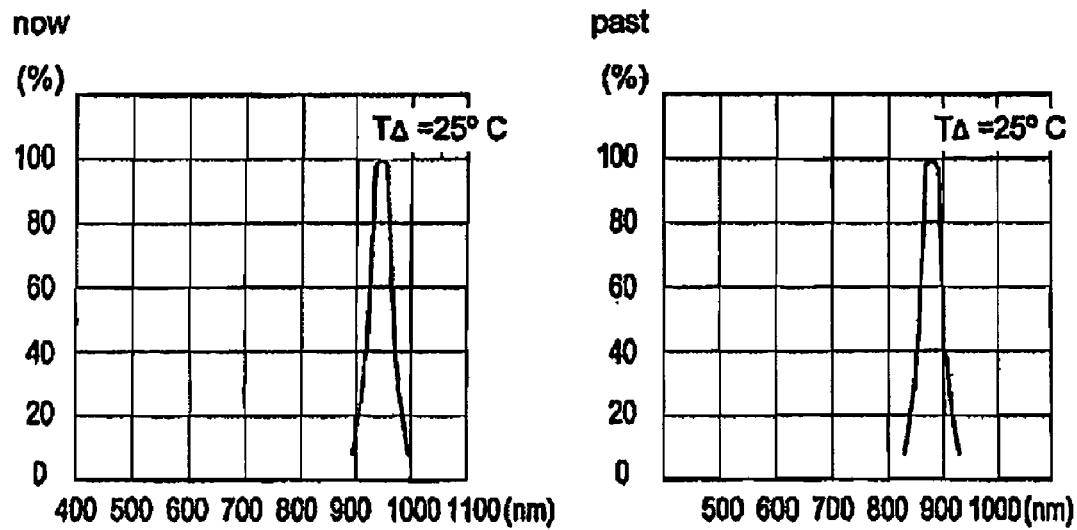
FIG. 5 is a graph of a typical IRED (infrared emitting diode) source in an ATM having a wavelength in the range of about 820-920 nm or 900-1000 nm in accordance with an exemplary embodiment of the present invention.
Figure 6:
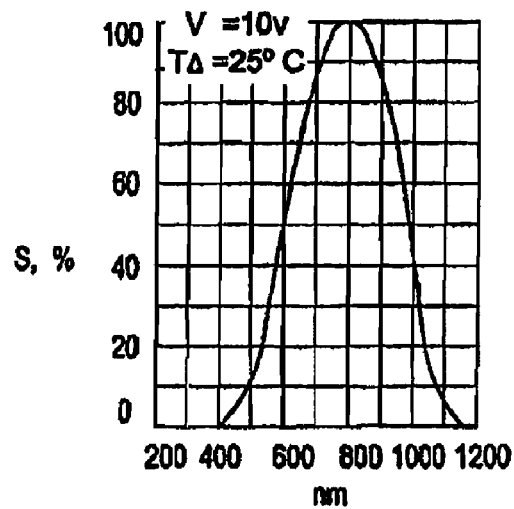
FIG. 6 is a graph of a spectral sensitivity curve of a typical phototransistor having a wavelength in the range of about 400 nm-1100 nm in accordance with an exemplary embodiment of the present invention.

In addition to the IR inks, the optically recognizable compound may alternatively be a film or hot mirror which also blocks (absorbs or reflects) infrared light, but transmits all other wavelengths of light. In an exemplary embodiment, the film is set between the front sheet 10 and back sheet 12. FIG. 4 is a graph of energy v. wavelength for the reflection and transmission of an exemplary IR film in accordance with an exemplary embodiment of the present invention. FIG. 4 shows that, while the visible light is transmitted through the film, the infrared light is blocked at higher wavelengths and a substantial amount of infrared light is reflected.

The optically recognizable compounds may be incorporated into plastic products, films, products, documents or other articles which may inhibit detection via phototransistors, CCD's, and/or the like. The material can be incorporated into a transaction card via a film, plastic, printing ink, coating or other application medium by grinding or the use of dispersed or deposited material into a liquid, paste or other type of medium. To minimize environmental damage to the ink, such as the ink being scratched, the ink is preferably applied directly onto the plastic sheets under the laminate (described below in step 170). Moreover, the infrared ink may be applied on the inside or outside surface of the plastic sheets.

In an exemplary embodiment, incorporating the optically recognizable compound into an article may not require a separate printing unit, modifications to existing processing equipment or an additional operational step. Particularly, the fabrication of the articles, such as a transaction card, utilizes existing equipment which incorporate colorants anyway, so the application of the optically recognizable compounds to the existing colorants do not add extra equipment or steps to the process.

In a further exemplary embodiment, the optically recognizable compounds block light which is detectable by machines. More particularly, the machines suitably detect the presence of a card via infrared interference at one or several wavelengths. In an exemplary embodiment, detection of materials may include the production of a visual effect when the materials are interrogated with invisible infrared radiation from the proper instrument, and when such radiation contacts the infrared material, a visual effect, such as a colored light, can be seen. Alternatively, the materials may be detected by a remote detector that will indicate the presence of the materials. Detection or authentication of the materials occurs above and below the stimulation wavelength of the reading device. As such, once the optically recognizable material has been detected, the detection device may then provide the user with a positive identification signal, which is preferably located on or near the detection device.

Figure 8:
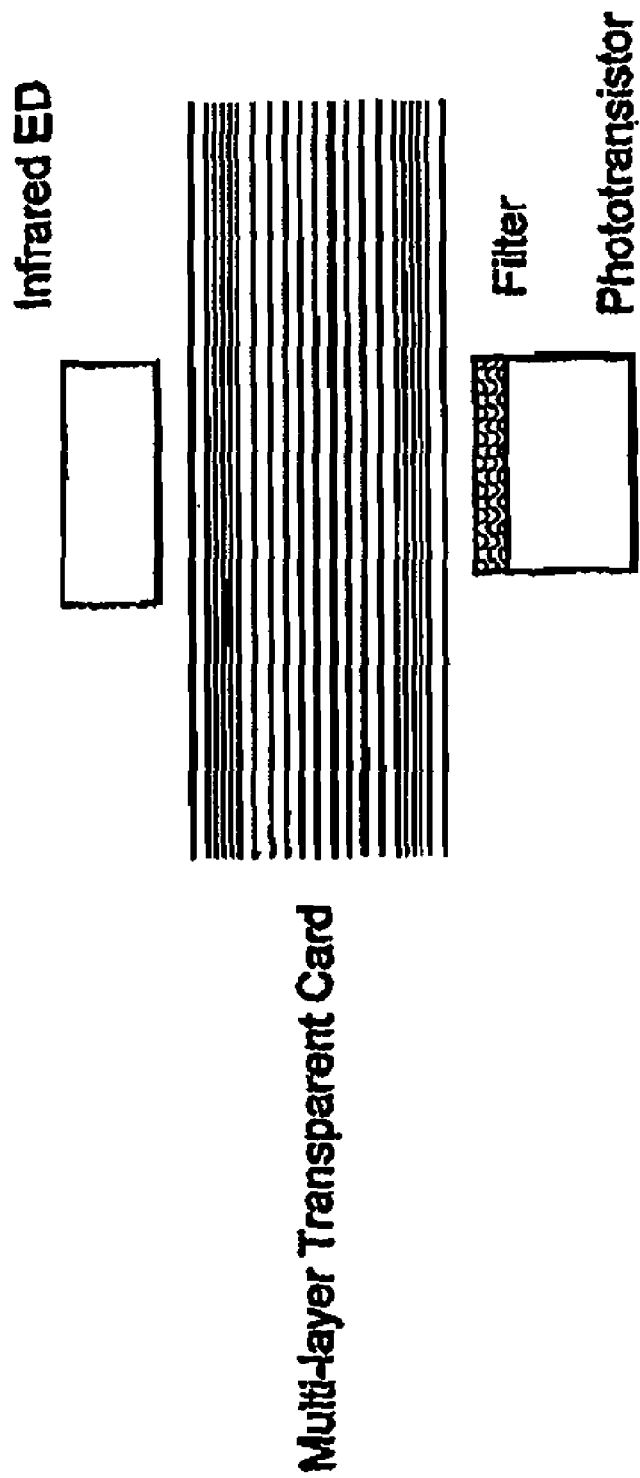
FIG. 8 is a schematic diagram of an exemplary sensor mechanism within an ATM in accordance with an exemplary embodiment of the present invention.

In an exemplary embodiment, the detection of IR materials trigger the sensors in ATM machines. In particular, with respect to FIG. 8, the present invention allows for the passage of a greater percentage of visible light (from about 400 nm to 700 nm), which allows the card to appear translucent in nature, while allowing for the blockage of certain light (from about 700 nm and above) to allow the phototransistors in ATM's to detect that a card has been inserted into the carriage mechanism. As discussed above, an exemplary ATM sensing device includes an IRED, a filter and a phototransmitter.

In addition to triggering the sensors in ATM machines, translucent card 5 can be used with any magnetic stripe or smart card reader. The reader system can include a card reader/writer, a point-of-sale terminal, ATM or any other acceptance device. In an exemplary embodiment, card 5 is used in conjunction with a reader which, not only detects the existence of the card, but also illuminates the transparent portion of card 5 when the card is inserted into the reader. The illumination source can be either an incandescent or solid state source (infrared emitting diode or laser). In operation, when the card is inserted into the acceptance device, the edge of the card presses against the illumination assembly (or activates a switch, interrupts a beam, etc.). Depending upon the application of the card, the illumination source can be under the control of the acceptance device or external software. Thus, the illumination source can flash or display a particular color if directed by the external software program. Additionally, depending on the structure of the card, the illumination source could be used to excite an embedded design useful for security or product enhancement.

Figure 2:
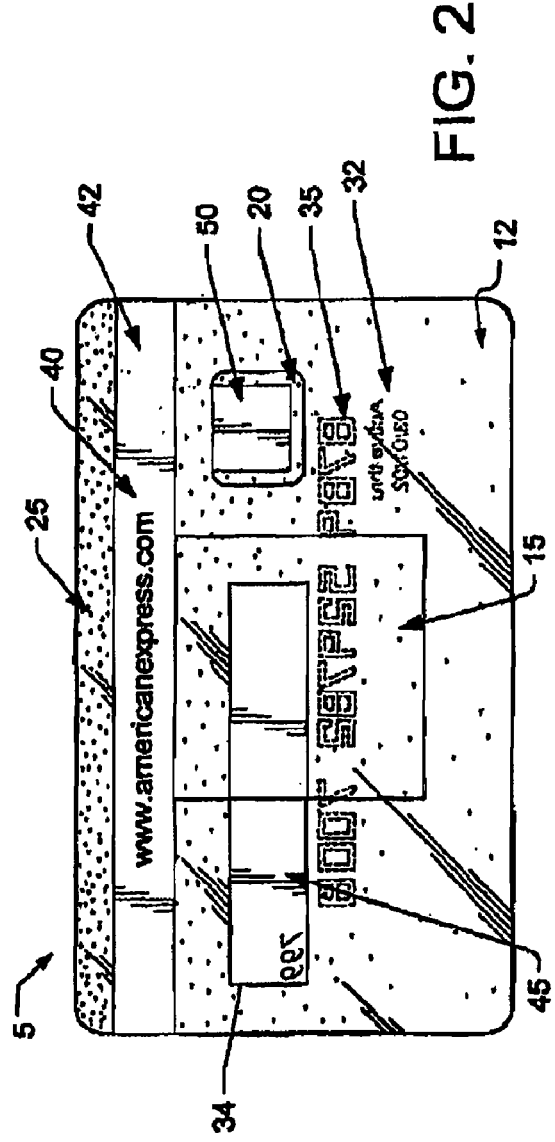
FIG. 2 is a back view of an exemplary transaction card in accordance with an exemplary embodiment of the present invention.

As discussed above, the optically recognizable compounds may be incorporated into any type of article. An exemplary article is a transaction card which may itself include any number of numerous features. In an exemplary embodiment, the present invention includes, generally, a transaction card 5 comprised of base containing opaque, transparent or translucent plastic layers 10, 12 and multiple features affixed to the card 5 such as text 30, 32, 34, logos 50, embossed characters 35, magnetic stripe 42, signature field 45, holographic foil 15, IC chip 20 and opacity gradient 25 (FIGS. 1 and 2).

Card 5 also includes an optically recognizable compound, described above, for allowing the transparent or translucent transaction card 5 to be recognized by card reading devices, such as ATMs, and/or for allowing the transparent transaction card 5 to be recognized and counted during card fabrication. The optically recognizable compound on transparent card 5 is a substantially invisible or translucent infrared ink, mirror or film which blocks (absorbs or reflects) infrared light but transmits all other wavelengths of light (see FIG. 4). Card 5 can be used for credit, charge, debit, access, identification, information storage, electronic commerce and/or other functions.

Figure 3:
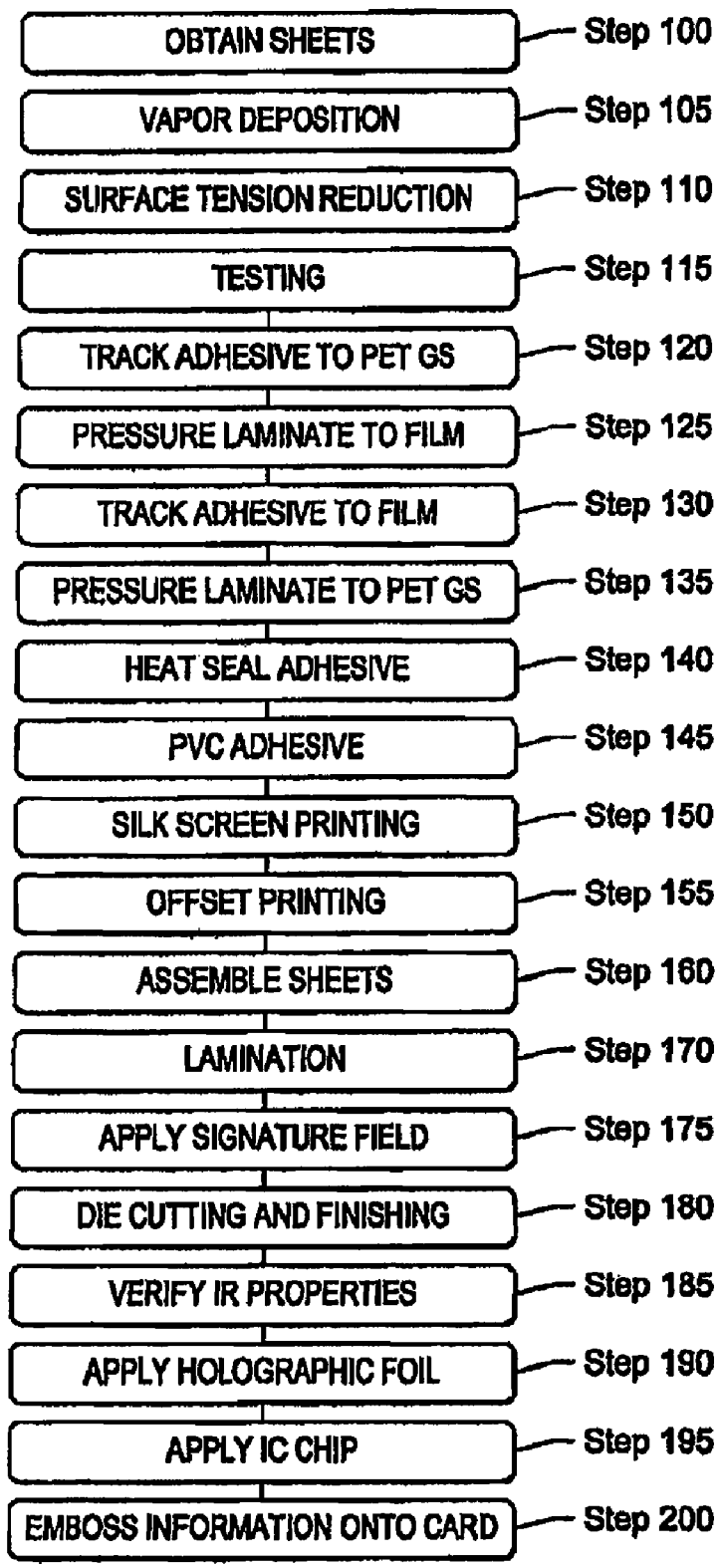
FIG. 3 is a flow diagram of the card fabrication process in accordance with an exemplary embodiment of the present invention.

With respect to FIG. 3, to fabricate card 5 having a front and back surface in accordance with an exemplary embodiment of the present invention, a front sheet 10 and back sheet 12 (FIGS. 1 and 2) consisting of a plastic substrate such as, for example, clear core PVC, are produced (step 100). One skilled in the art will appreciate that sheets 10 and 12 of card 5 may be any suitable transparent, translucent and/or opaque material such as, for example, plastic, glass, acrylic and/or any combination thereof. Each sheet 10, 12 is substantially identical and is preferably about 3'×4' (622 mm×548 mm) and about 0.005-0.350 inches, or more preferably 0.01-0.15 inches or 13.5 mil thick.

Figure 7A:
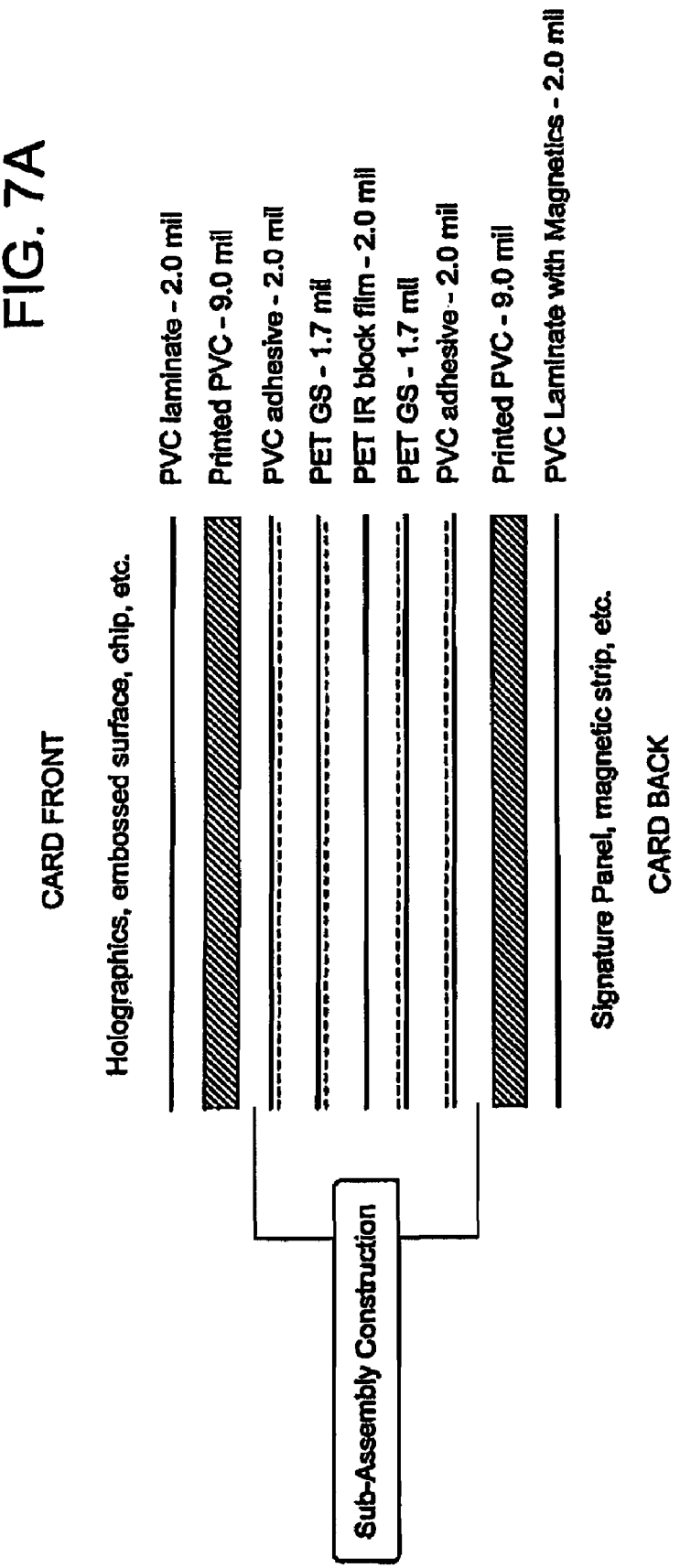
Figure 7B:
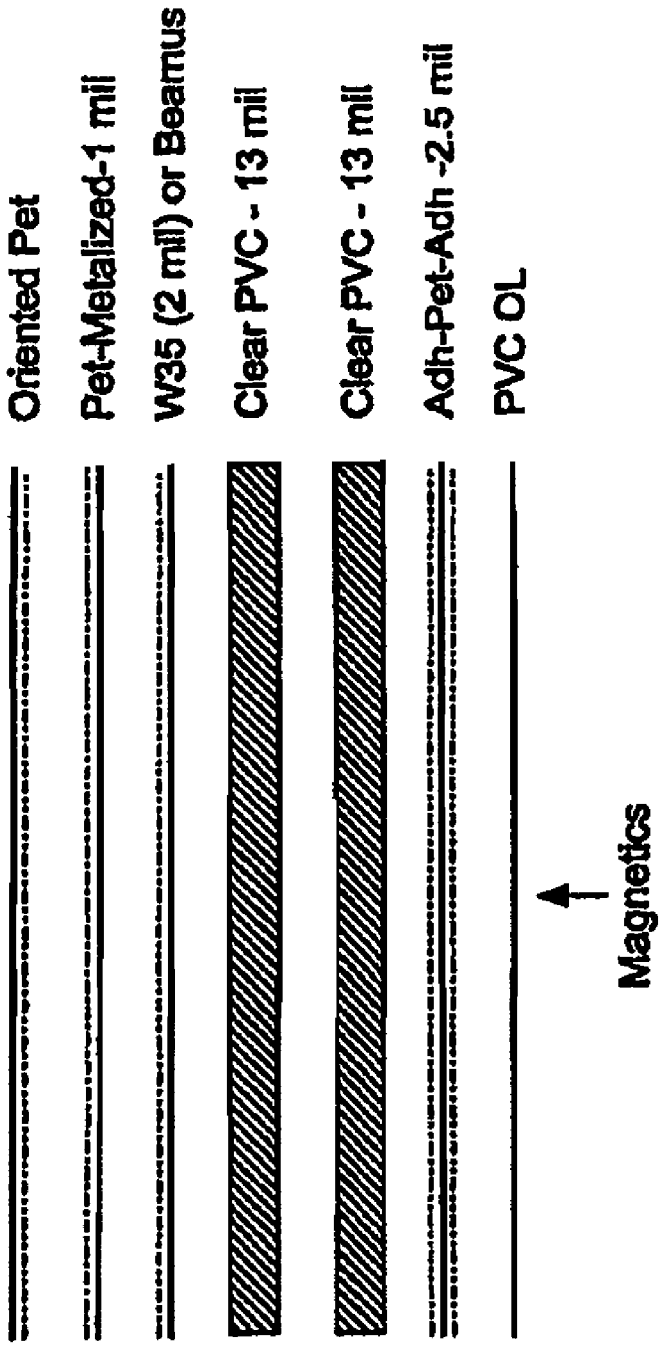
Figure 7C:
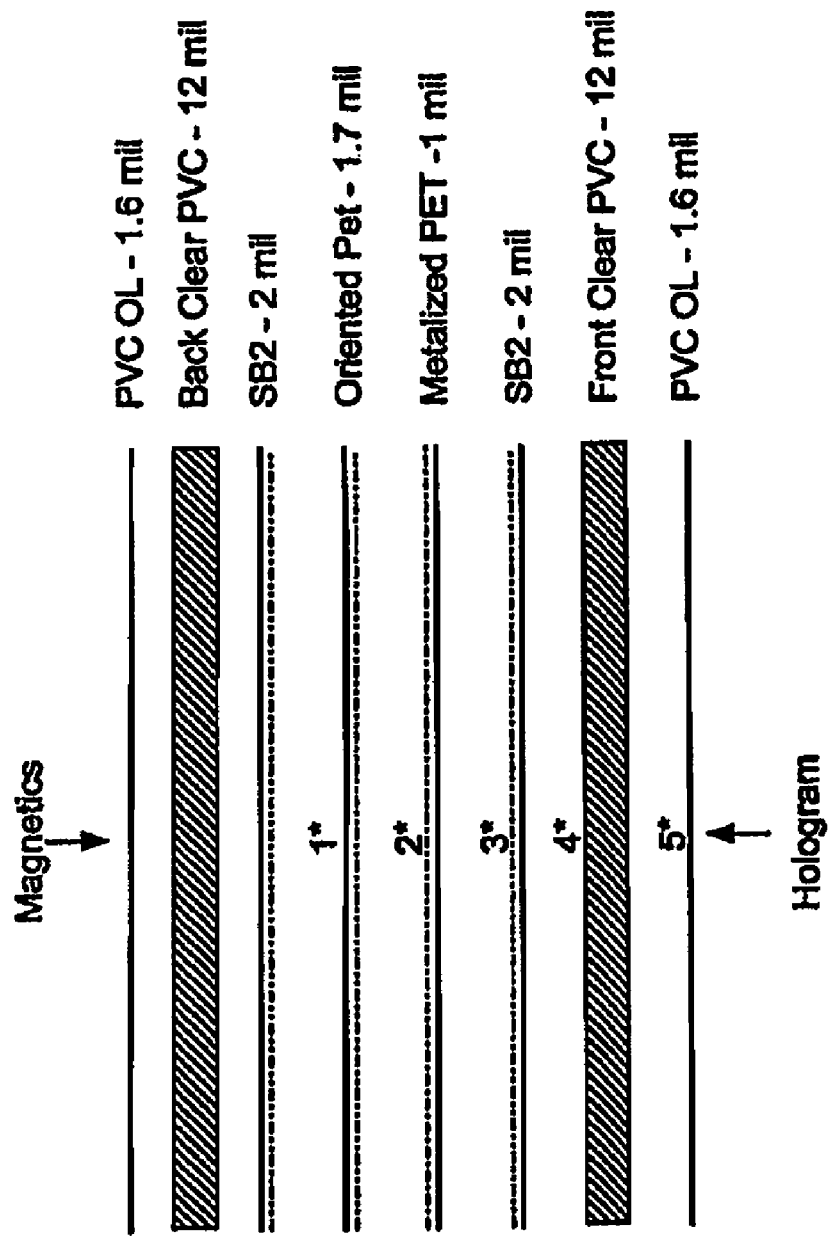
Figure 7D:
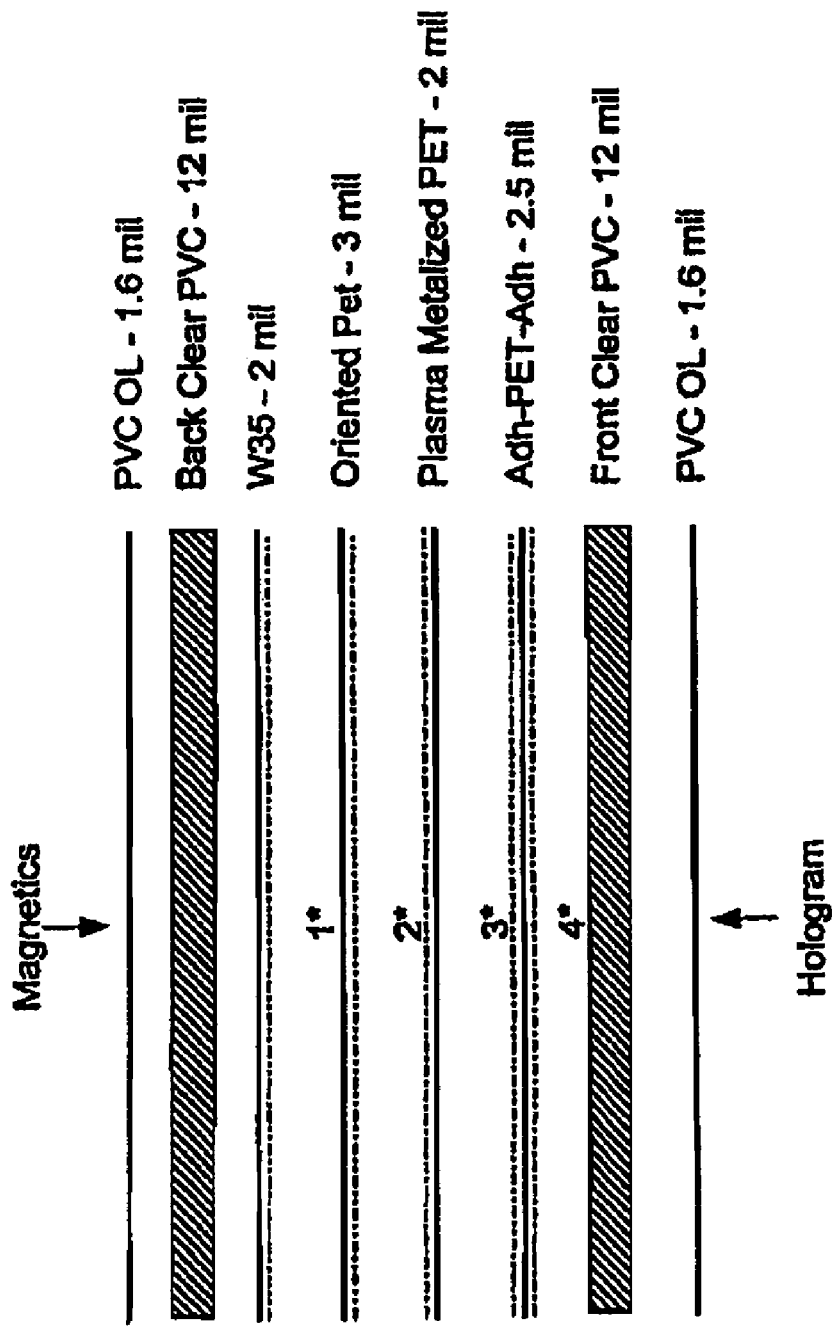
Figure 7E:
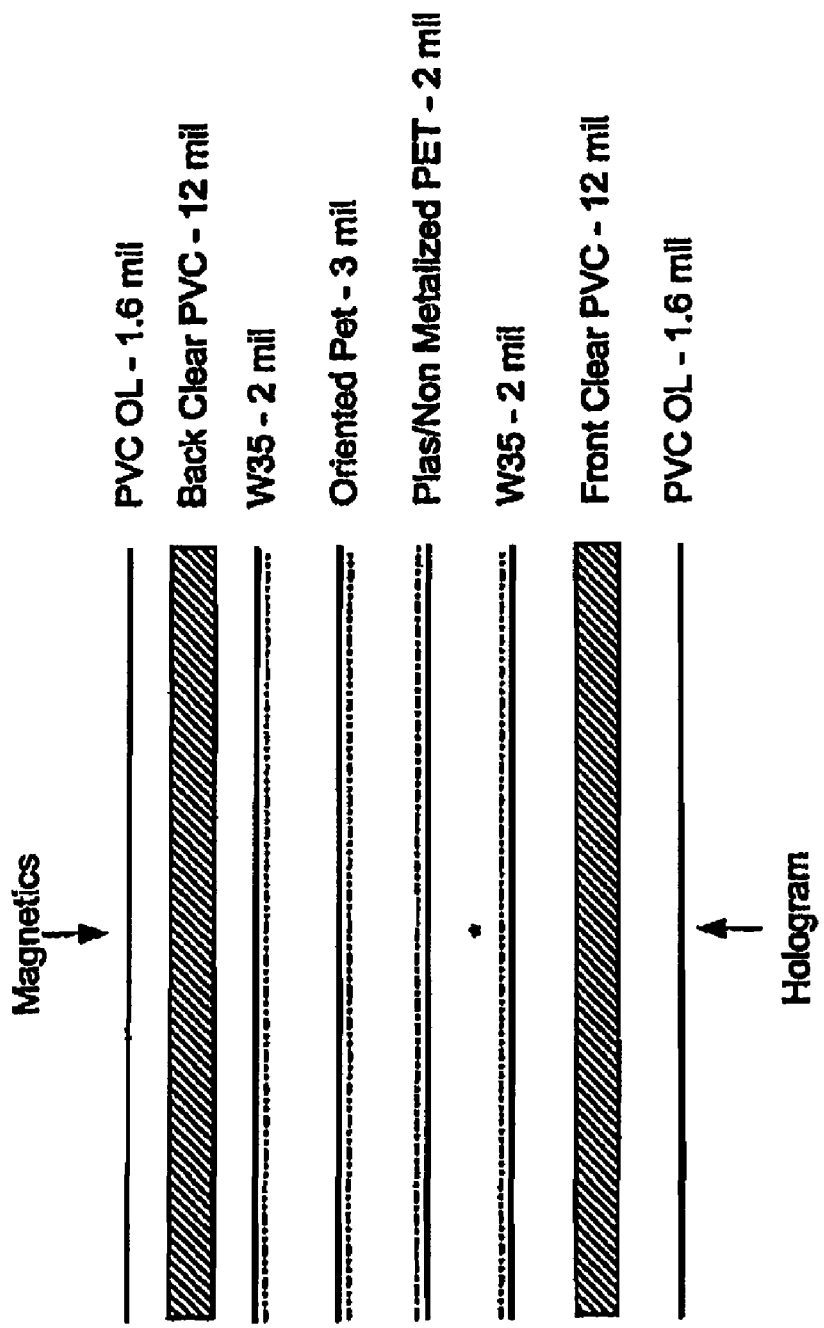
Figure 7F:
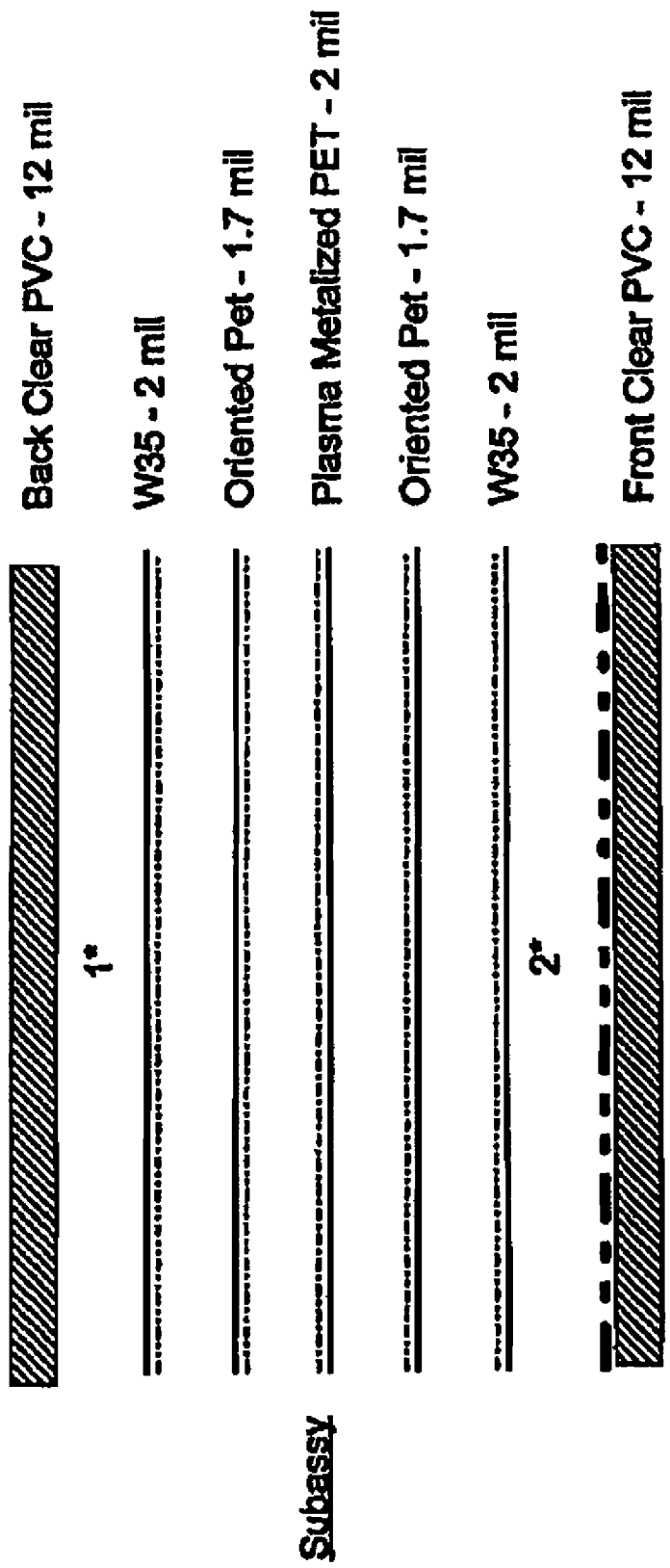

With respect to FIG. 7A, the fabrication of the individual card sheets includes either direct layout (9 layers) of film or the use of a sub-assembly (5 layers). An exemplary subassembly consists of 5 layers of film with room temperature tack adhesive applied over thermoset and thermoplastic adhesives. The resulting cards comprise (from the card front towards the card back) 2.0 mil outer laminate (PVC, polyvinylchloride) having the holographic foil, embossed surface, chip and other indicia on its surface, 9.0 mil printed PVC core with print side out (card front), 2.0 mil PVC adhesive, 1.7 mil PET GS (extrusion coated polyethyleneterephthalate—gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product. Other exemplary embodiments of the layers are shown in FIGS. 7B-7H.

Figure 7G:
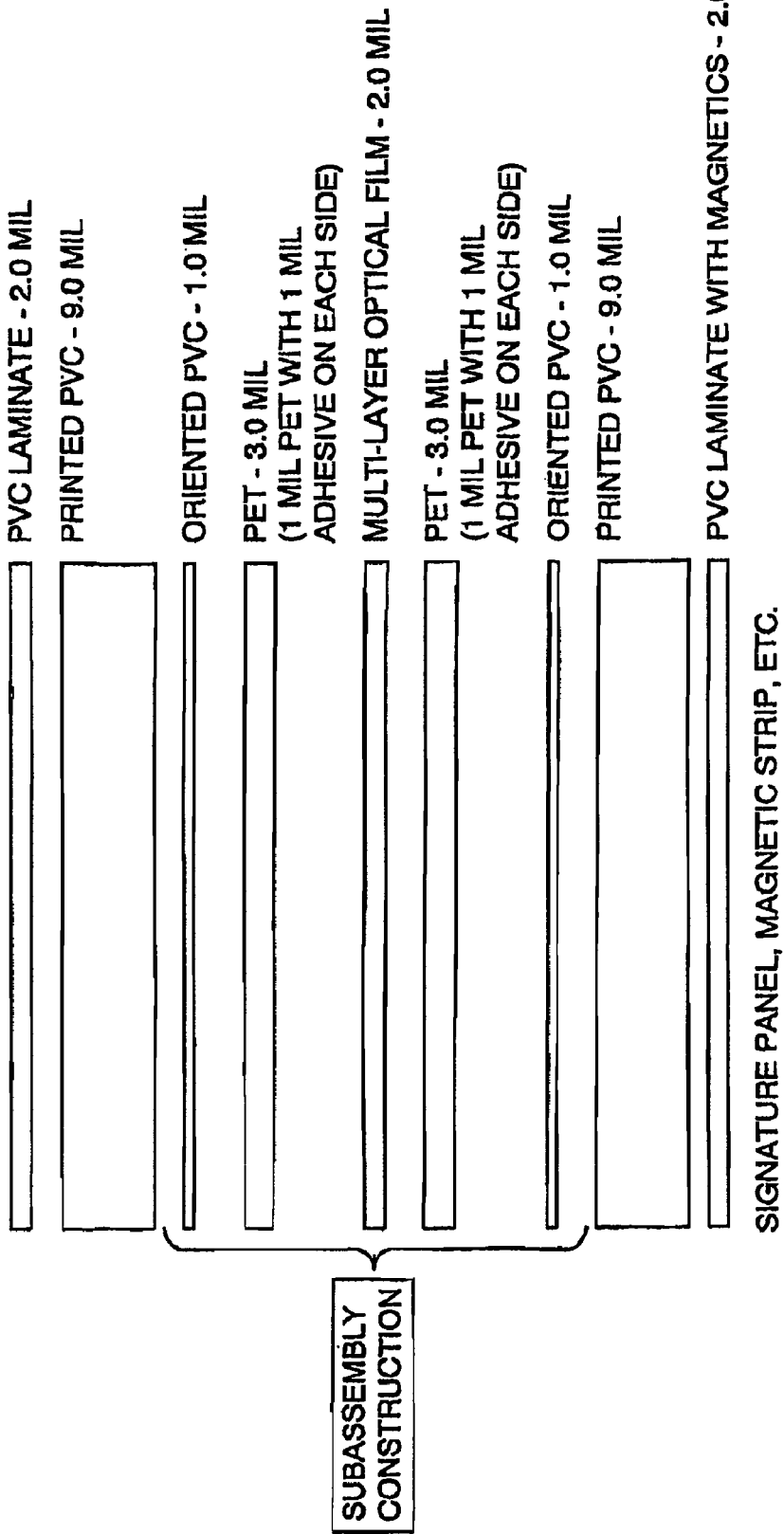

Specifically, FIG. 7G illustrates an alternate embodiment of the individual transaction cards. As with FIG. 7A, card sheets may be constructed as described in FIG. 7H. Each card sheet may include nine layers of film or the use of a five layer subassembly. The resulting cards comprise (from the card front towards the card back) about 2.0 mil outer laminate (PVC) having the holographic foil, embossed surface, chip and/or other indicia on its surface, about 9.0 mil printed PVC core with print side out (card front), about 1.0 mil oriented PVC, about 3 mil adhesive (1 mil PET with 1 mil adhesive on each side), about 2.0 mil PET IR blocking film, as described above, about 3.0 mil adhesive (1 mil PET with 1 mil adhesive on each side), about 1.0 mil oriented PVC, about 9.0 mil printed PVC core with print side out (card back), and about 2.0 mil outer PVC laminate comprising a signature panel, applied magnetic stripe and/or any other indicia apparent to one having ordinary skill in the art. As with the card described in FIG. 7A, the PET IR blocking film is fabricated in the middle of the layers to balance the card and minimize warping of the resulting card product.

The adhesive layers described above with reference to FIG. 7G (the 3.0 mil adhesive) that may be disposed on either side of the 2.0 mil PET IR blocking film preferably comprise a first layer of a polyester (1.0 mil PET) having second and third layers of a polyester-based adhesive disposed on either side of the first layer of polyester. The polyester-based adhesive layers may each be about 1.0 mil. Preferably, the polyester-based adhesive layers exhibit excellent adhesion to polyester and PVC, in that it binds to both the PET IR blocking film on one side of the 3.0 mil adhesive and the 1.0 mil oriented PVC layer on the other side. Specifically, a preferable material that may be used as the polyester-based adhesive is Bemis Associates Inc. 5250 Adhesive Film. Alternatively, another preferably material that may be used as the polyester-based adhesive is Transilwrap Company, Inc. Trans-Kote® Core Stock KRTY.

The card sheet of FIG. 7G, including the nine layers of film and/or the use of a five layer subassembly, as described above, may be constructed together by a lamination process as is known to someone having ordinary skill in the art using heat and pressure. A preferred method of constructing the cards as described in FIG. 7H utilizes a two-step lamination cycle, wherein a first hot step includes laminating the layers of the cards together at a pressure of about 170 psi at a temperature of about 300° F. for about 24 minutes. A second step includes laminating the layers together at a pressure of about 400 psi at a diminished temperature of about 57° F. for about 16 minutes. Of course, other methods of constructing the cards may be utilized.

Of course, other multilayer films may be utilized that incorporate an optical film therein (as described above) for blocking light of one or more ranges of electromagnetic radiation while allowing another range or ranges of electromagnetic radiation to be transmitted therethrough. The multilayer films may have any sequence of layers of any material and thickness to form individual transaction cards as herein defined.

FIG. 7I illustrates another exemplary card sheet construction according to the present invention. Specifically, FIG. 7I illustrates another transparent or translucent card having an IR blocking optical film incorporated therein, as described above with reference to FIGS. 7A and 7G. The card sheet construction defined below may be made via a coextrusion/lamination process. Specifically, the card sheet comprises a layer of a PET IR blocking optical film (about 2.0 mils), as described above. An EVA-based material (about 2.0 mils) may be coextruded onto each side of the IR blocking film to form a 3-layer subassembly. The 3-layer subassembly may then be laminated on each side to a printed PVC layer (each about 11 mils). The card may further have PVC laminate layers (each about 2.0 mils) disposed on sides of the printed PVC layers thereby forming outside layers of the card.

Preferable materials that may be utilized as the EVA-based material that is coextruded to the PET IR blocking film are acid modified EVA polymers. The acid modified EVA polymers may preferably be Bynel® Series 1100 resins. Typically, the Bynel® Series 1100 resins are available in pellet form and are used in conventional extrusion and coextrusion equipment designed to process polyethylene resins. The Bynel® Series 1100 resins have a suggested maximum melting temperature of about 238° C. However, if adhesion results are inadequate, the melting temperature may be lowered. The remaining layers of the card may be laminated to the card as described above, or via any other lamination process to form a card.

Figure 7H:
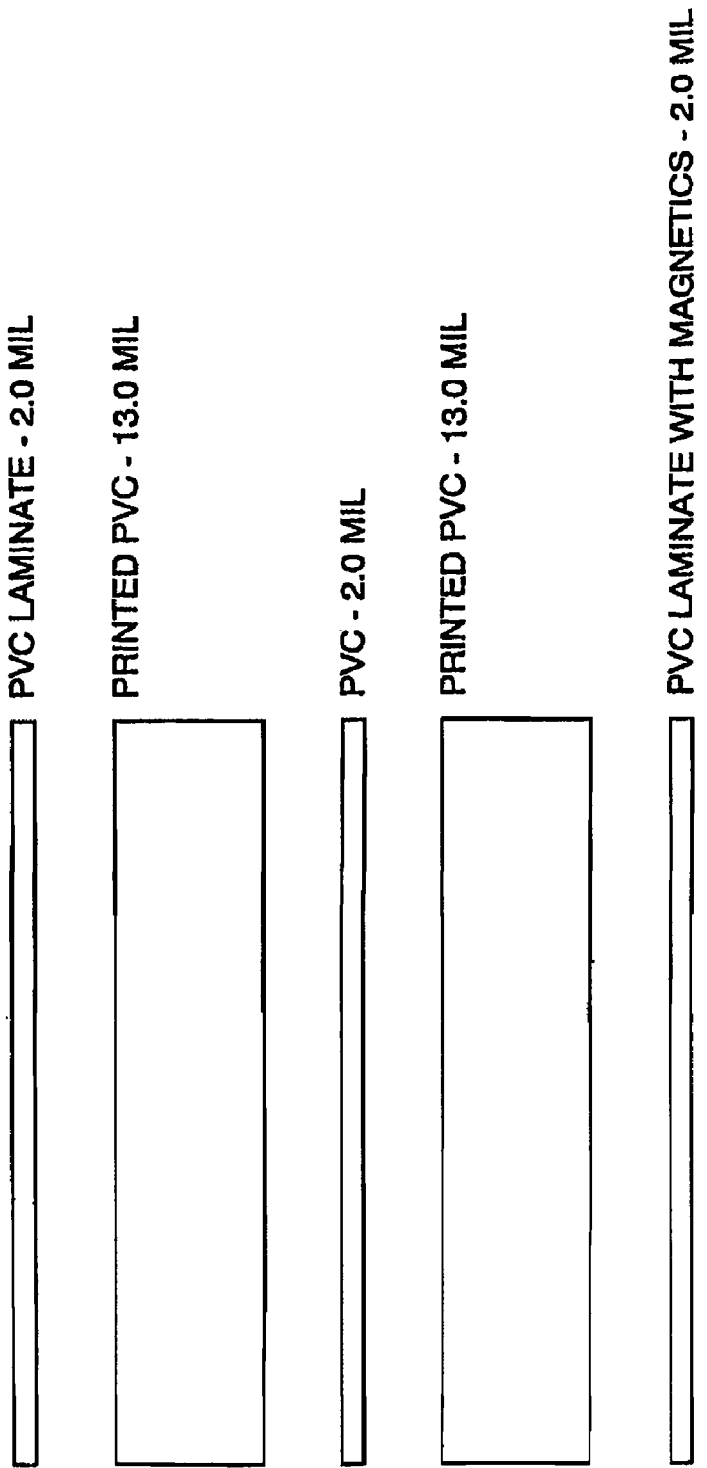

In addition, FIG. 7H illustrates another exemplary card sheet construction according to the present invention. Specifically, FIG. 7H illustrates a transparent or translucent multilayer transaction card having an IR blocking ink incorporated therein. The IR blocking ink may be any ink having the characteristic of blocking IR radiation from being transmitted through the transaction card. Examples 1 and 2, noted above, describe two possible ink compositions that may be used. Of course, others may be used as well and the invention should not be limited as herein described.

The card sheet in FIG. 7H may comprise (from the card front to the card back) an outer layer of about 2.0 mil PVC laminate having the holographic foil, embossed surface, chip, and/or other indicia on its surface, about 13.0 mil printed PVC, about 2.0 mil PVC core, about 13.0 mil printed PVC, and an outer layer of about 2.0 mil PVC laminate comprising a signature panel, applied magnetic stripe and/or any other indicia apparent to one having ordinary skill in the art. It should be noted that the PVC core layer (herein described, according to FIG. 7H, as being about 2.0 mil thick) may be optional, and may be included if a thicker card is desired. Of course, the PVC core layer may be any thickness to create a transaction card having any thickness desired. These cards may be printed on the core PVC layer with IR blocking ink across the entire surface of the layer according to the printing methods described above with respect to Examples 1 and 2, above. Of course, any other method of printing or IR blocking ink may be utilized in the transaction card according to the present invention.

After the card sheets are laminated, according to the method described above or via any other method, the sheets are cut into individual cards by a known stamping process, including any necessary curing, burrowing, heating, cleaning, and/or sealing of the edges. Each individual transaction card is about 2.5"×3.0", and therefore conform to ISO standards for transaction card shape and size.

Figure 12A:
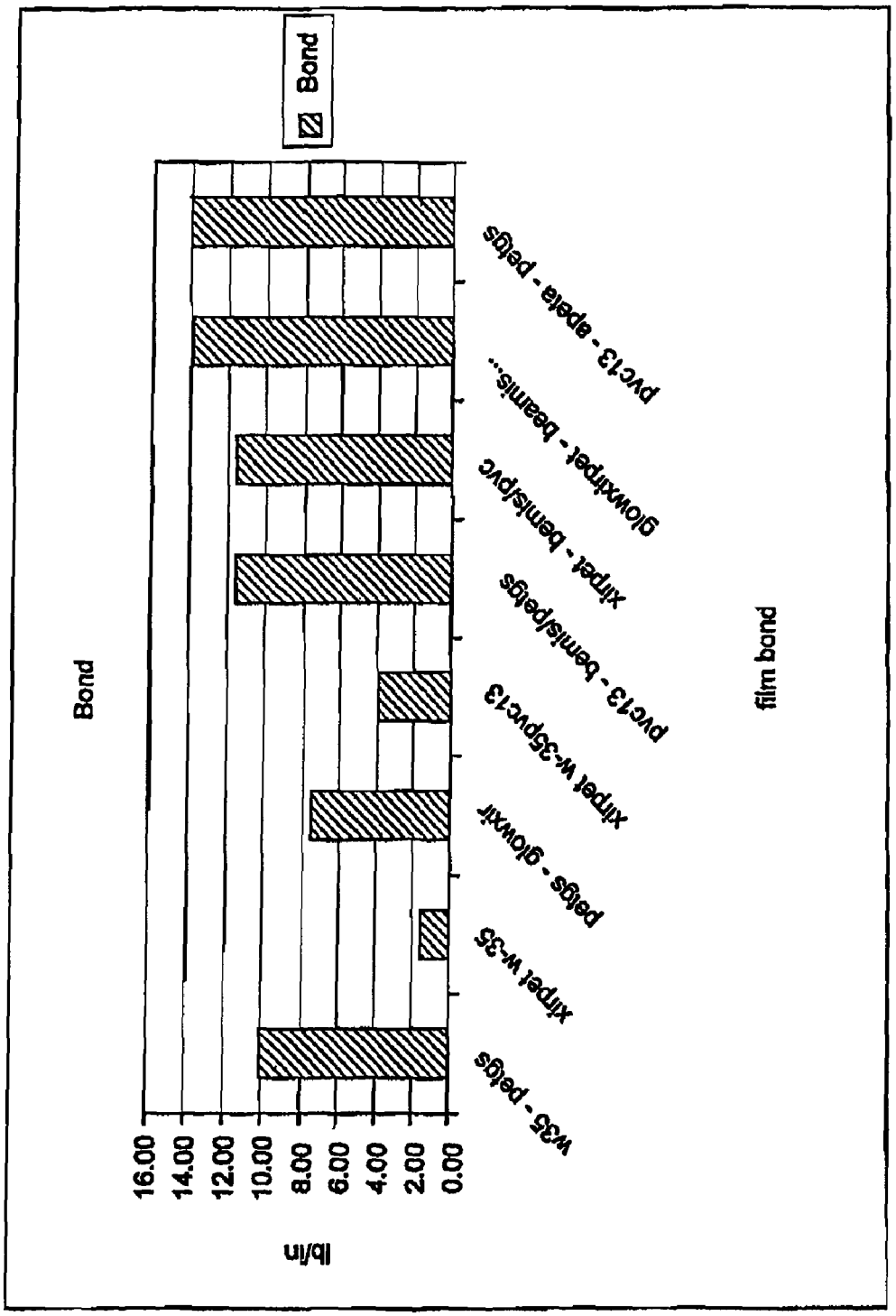
FIG. 12A shows exemplary film bond strengths on a graph of strength (lb/in) v. film bond for various film bonds in accordance with an exemplary embodiment of the present invention.
Figure 12B:
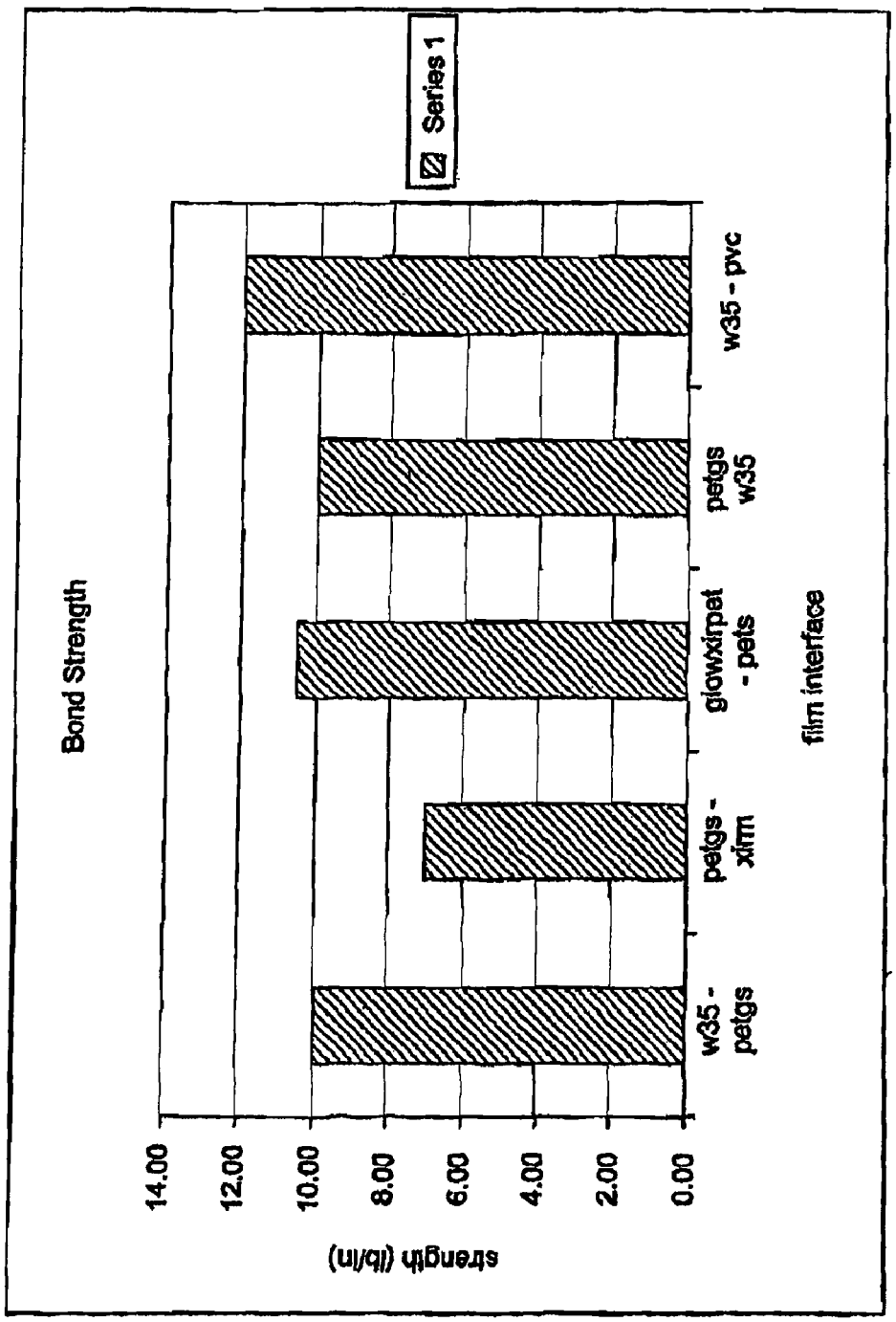
FIG. 12B shows exemplary bond strengths at the film interfaces on a graph of strength (lb/in) v. film interface for various film interfaces in accordance with an exemplary embodiment of the present invention.

Moreover, FIG. 11 details exemplary embodiments of layers/sheets for card construction, including layer number, material, layer thickness (in mil), source/manufacturer of the material, comments regarding bond strength data and total thickness (in mil). Additionally, with respect to FIG. 12A, the film bond strength is indicated on a graph of strength (lb/in) v. film bond for various film bonds. With respect to FIG. 12B, the bond strength at the film interfaces is indicated on a graph of strength (lb/in) v. film interface for various film interfaces.

After eventually combining the sheets (step 160), by preferably adhering the front sheet 10 on top of the back sheet 12, the total thickness of the transaction card 5 is about 0.032 in. (32 mil.), which is within the ISO thickness standard for smart cards. Because the IC chip 20 is eventually embedded into the surface of the substrate (step 195), and the surface of chip 20 is co-extensive with the outer surface of the front sheet 10, the IC chip 20 does not affect the thickness of the overall card 5. Moreover, the about 3'×4' sheets include markings which define the boundaries of the individual cards 5 which will be cut from the sheet. Each exemplary sheet yields over 50 transaction cards (typically 56 cards), wherein each card 5 is within the ISO card size standard, namely about 2"×3.5".

Figure 10:
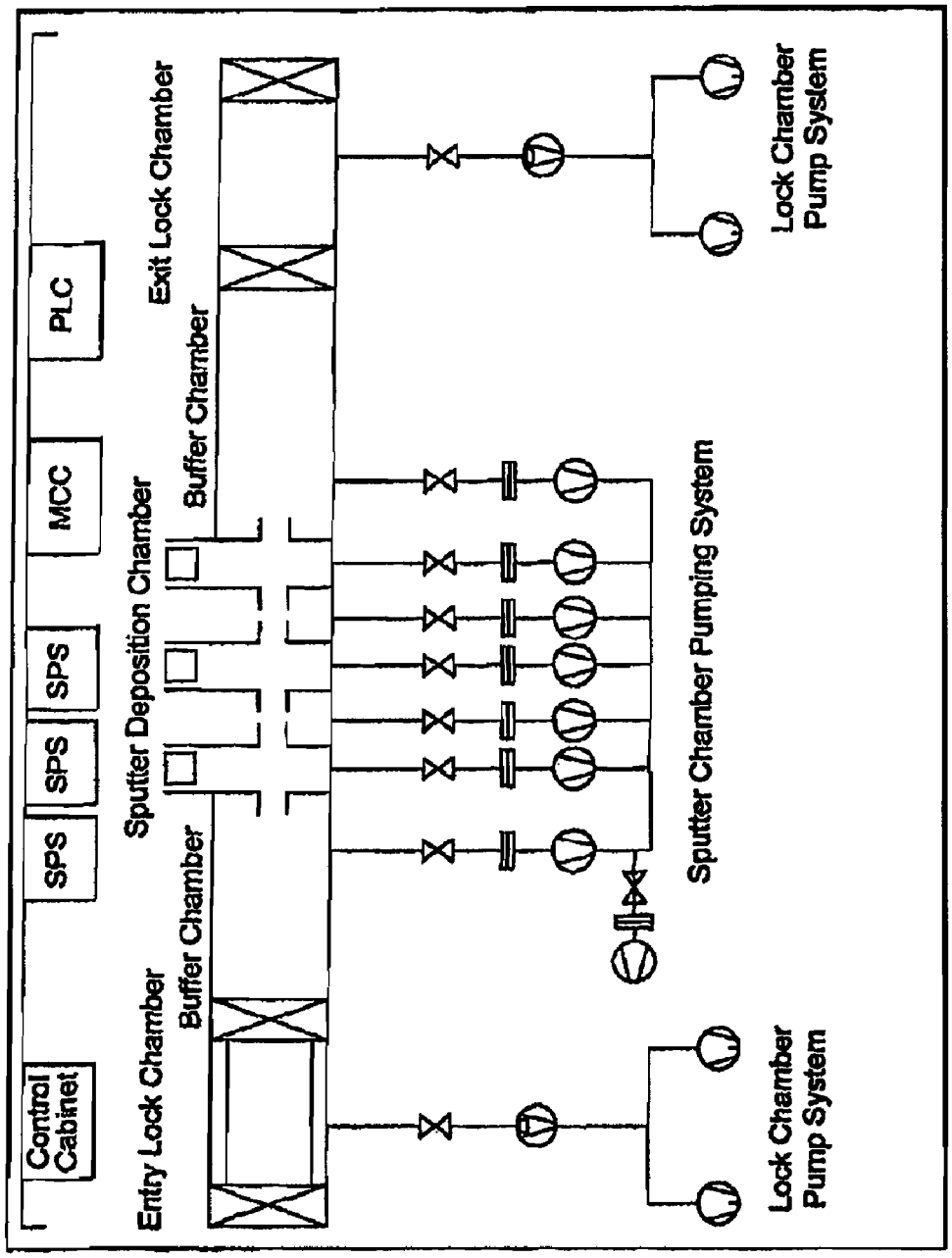
FIG. 10 shows an exemplary system for chemical vapor deposition of PET film in accordance with an exemplary embodiment of the present invention.

In general, an exemplary process for construction of card 5 having an IR film includes chemical vapor deposition of PET film which has optimal visible and infrared properties (step 105). The chemical deposition is preformed by a Magnetron Machine manufactured by the Magnetron Company. With respect to FIG. 10, the process incorporates a roll chemical vapor deposition sputtering system with three coating zones. The Magnetron roll vapor deposition machine deposits evaporation batches containing Ag, Au and Indium oxide onto optical grade polyethyleneterephthalate using chemical vapor deposition. The Ag/Au/Indium layers are about 100 angstroms each and, depending on the lower wavelength reflections, about three to five layers exist. More details related to vacuum coating, solar coating and Magnetron sputtering can be found in, for example, "Handbook of Optical Properties, Volume I, Thin Films for Optical Coatings" edited by Rolf Hummel and Karl H. Guenther, 1995, CRC Press, Inc, the entire contents of which is hereby incorporated by reference.

Figure 9:
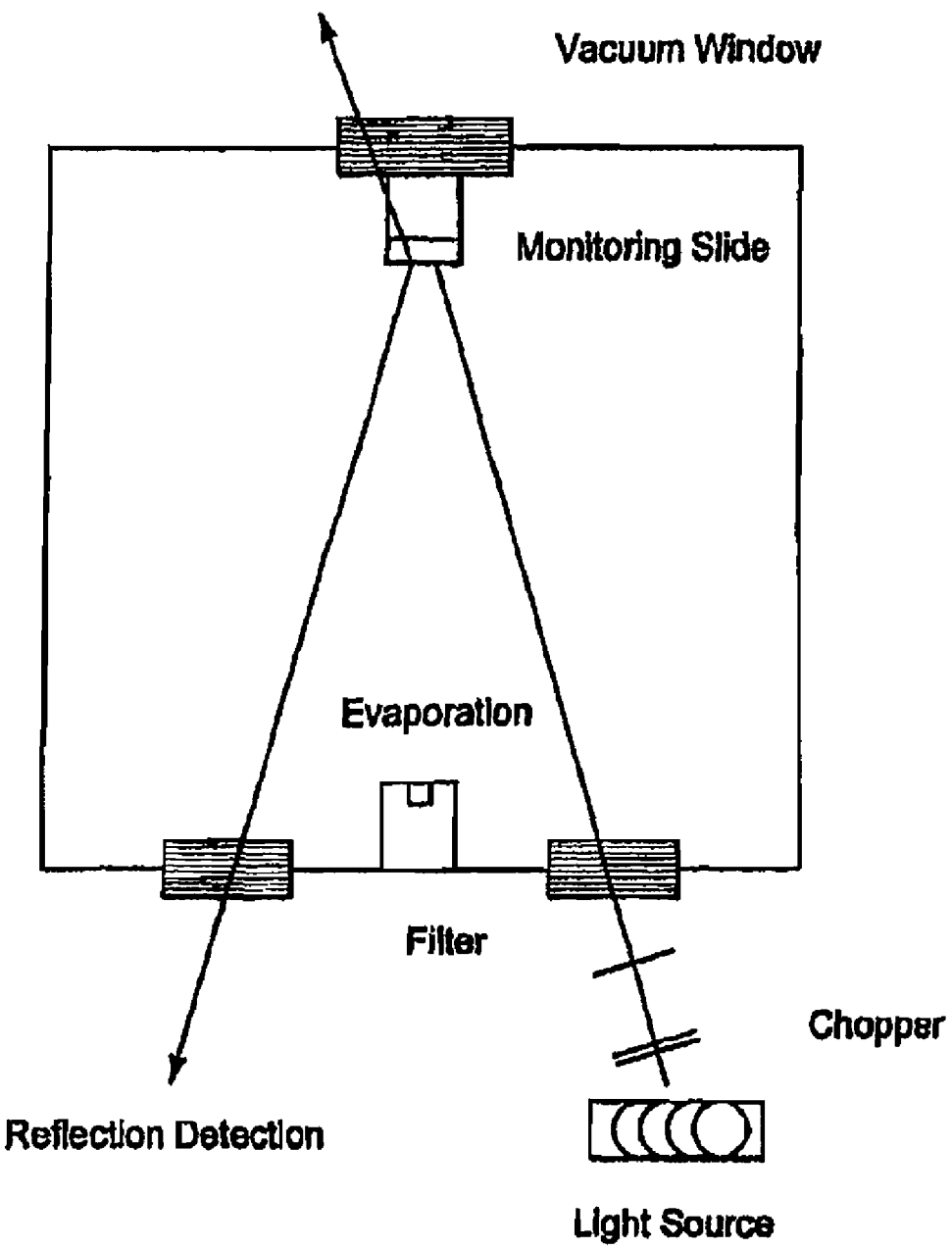
FIG. 9 is an exemplary reflection and transmission monitor with various optical components for vacuum evaporation in-line roll coating operations for monitoring the IR film in accordance with an exemplary embodiment of the present invention.

Next, plasma or flame treatment is applied to the PET film for surface tension reduction of the film (step 110). During the deposition and assembly of the layers, the IR film is monitored to optimize the IR blocking spectrum. Thus, the film is then tested against a standard by using a spectrophotometer to test the visible and infrared properties of the PET film (step 115). With respect to FIG. 9, a reflection and transmission monitor with various optical components for vacuum evaporation in-line roll coating operations is utilized to monitor the IR film. In-line spectrophotometric monitoring is part of the vapor deposition process. Transmission at various wavelengths is monitored during the entire run. A tack adhesive is applied to PET GS (polyethyleneterephthalate—gluable/stampable) (step 120) and a pressure laminate is applied to the Indium Oxide metal surface of the PET IR blocking film (step 125). Next, a tack adhesive is applied to the PET side of the IR blocking film (step 130) and a pressure laminate is applied to the PET GS (step 135). Exemplary lamination conditions include 280 F. degrees and 600 psi for 22 minutes, then cooled under pressure for about 18 minutes. A heat seal adhesive is applied to both outer sides of the PET GS, or alternatively, a PVC adhesive is applied to both outer sides of the PET GS (step 140).

In an exemplary embodiment, certain compounds are printed over the surface of sheets 10 and 12. One skilled in the art will appreciate that the printing of the text 30, 32, 34, logos 50, optically recognizable ink and opacity gradient 25 may be applied to any surface of card 5 such as, for example, the front 10 face, the rear 12 face, the inside or outside surface of either face, between the two sheets of base material and/or a combination thereof. Moreover, any suitable printing, scoring, imprinting, marking or like method is within the scope of the present invention.

The opacity gradient 25 and optically recognizable ink are printed onto the sheets by a silk screen printing process (step 150). With respect to the opacity gradient 25, the exemplary gradient is comprised of a silver pearl ink gradation having an ink stippling which is more dense at the top of card 5 and gradually becomes less dense or clear as it approaches the bottom of card 5. One skilled in the art will appreciate that the opacity gradient 25 can be any density throughout the gradient 25 and the gradient 25 can traverse any direction across card 5 face. The opacity gradient 25 can be formed by any substance which can provide a similar gradient 25 on card 5. The exemplary ink gradient 25 for each card 5 is printed using known printing inks suitably configured for printing on plastic, such as Pantone colors. In an exemplary embodiment, the ink used for the stippling 25 is a silver pearl ink and is applied to the outside surface of each plastic sheet. Ink gradient 25 is printed on the surface of each of the sheets using a silk screen printing process which provides an opaque, heavier ink coverage or using offset printing process which provides halftone images in finer detail. The words "American Express" are printed in Pantone 8482 using a similar silkscreen process.

More particularly, with respect to silk screen printing, artwork containing the desired gradient 25 is duplicated many times to match the number of individual cards 5 to be produced from the sheets. The duplicated artwork is then suitably applied to a screen by any suitable known in the art photolithographic process and the screen is then developed. The screen is placed over the sheet and ink is suitably washed across the surface of the screen. The exposed portions of the screen allow the ink to pass through the screen and rest on the sheet in the artwork pattern. If multiple colors are desired, this process can be repeated for each color. Moreover, other security features are optionally silk printed on card 5 such as, for example, an invisible, ultraviolet charge card logo (visible in black light) is printed in a duotone of Pantone 307 and 297 using offset and silk screen presses.

The text 30, 32, 34 and logo 50 are printed on the outside surface of each sheet by a known printing process, such as an offset printing process (step 155) which provides a thinner ink coverage, but clearer text. More particularly, with respect to offset printing, the artwork is duplicated onto a metal plate and the metal plate is placed onto an offset press printing machine which can print up to four colors during a single run. The offset printed text includes, for example, a corporate name 30, a copyright notice 33, a batch code number 34, an "active thru" date 32, contact telephone numbers, legal statements (not shown) and/or the like. The exemplary offset text is printed in 4DBC in opaque white ink or a special mix of Pantone Cool Gray 11 called UV AMX Gray.

Because the resulting card 5 may be transparent, the text can be seen from both sides of card 5. As such, if the text is only printed on one sheet, the text may be obscured when viewing the text from the opposite side of card 5 (in other words, viewing the text "through" the plastic substrate). To minimize the obscuring of the text, the front sheet 10 is printed on its outside surface with standard format text and the back sheet 12 is printed on its outside surface with the same text, but the text is in "reverse" format. The back 12 text is aligned with the text on the front face 10, wherein the alignment of the text is aided by card 5 outline markings on the full sheet. Certain text or designs which may be obscured by an compound of card 5 (magnetic stripe 40, chip 20, etc.) may be printed on only one sheet. For example, in an exemplary embodiment, the corporate logo 50 is printed on only one sheet and is located behind the IC chip 20, thereby being hidden from the front 10 view and hiding at least a portion of the IC chip 20 from the back 12 view. One skilled in the art will appreciate that any of the offset printing can occur on the outside or inside surface of the sheets.

The sheet of laminate which is applied to the back 12 of card 5 (step 170) preferably includes rows of magnetic stripes 40, wherein each magnetic stripe 40 corresponds to an individual card 5. The magnetic stripe 40 extends along the length of card 5 and is applied to the back 12 surface, top portion of card 5 in conformity with ISO standards for magnetic stripe 40 size and placement. However, the magnetic stripe 40 may be any width, length, shape, and placed on any location on card 5. The two track magnetic stripe 40, including the recorded information, can be obtained from, for example, Dai Nippon, 1 1, Ichigaya Kagacho 1 chome, Shinjuku ku, Tokyo 162 8001, Japan, Tel: Tokyo 03 3266 2111. In an exemplary embodiment, the magnetic stripe is applied to the outer laminate using a tape layer machine which bonds the cold peel magnetic stripe to the outer laminate roll with a rolling hot die and at suitable pressure. The roll is then cut into sheets at the output of the tape layer before the card layers are assembled and the stripe is fused to the card during the lamination process.

Although prior art magnetic stripes 40 in current use are black, in a particularly exemplary embodiment, the magnetic stripe 40 of the present invention is a silver magnetic stripe 40. Exemplary silver magnetic stripe 40 is 2750 oersted and also conforms to ISO standards. Moreover, the silver magnetic stripe 40 includes printing over the magnetic stripe 40. The printing on the magnetic stripe 40 can include any suitable text, logo 50, hologram foil 15 and/or the like; however, in an exemplary embodiment, the printing includes text indicative of an Internet web site address. Dai Nippon Printing Co., Ltd (more information about Dai Nippon can be found at www.d-np.co.jp) prints a hologram or text on the mag stripe using, for example, the Dai Nippon CPX10000 card printer which utilizes dye sublimation retransfer technology having a thermal head which does not contact the card surface. The card printer utilizes the double transfer technology to print the image with the thermal head over a clear film and then re-transferring the printed image onto the actual card media by heat roller. The printing of information on the surface of the magnetic stripe 40 is preformed by, for example, American Banknote Holographics, 399 Executive Blvd., Elmsford, N.Y. 10523, (914) 592 2355. More information regarding the printing on the surface of a magnetic stripe 40 can be found in, for example, U.S. Pat. No. 4,684,795 issued on Aug. 4, 1987 to United States Banknote Company of New York, the entire contents of which is herein incorporated by reference.

After the desired printing is complete and the magnetic stripe applied, the front 10 and back 12 sheets are placed together (step 160), and the sheets are preferably adhered together by any suitable adhering process, such as a suitable adhesive. One skilled in the art will appreciate that, instead of printing on two sheets and combining the two sheets, a single plastic card 5 can be used, wherein card 5 is printed on one side, then the same card 5 is re-sent through the printer for printing on the opposite side. In the present invention, after adhering the sheets together, a sheet of lamination, approximately the same dimensions as the plastic sheets, namely 3'×4', is applied over the front 10 and back 12 of card 5. After the laminate is applied over the front 10 and back 12 of the combined plastic sheets (step 170), card 5 layers are suitably compressed at a suitable pressure and heated at about 300 degrees, at a pressure of between 90-700 psi, with a suitable dwell time to create a single card 5 device. The aforementioned card fabrication can be completed by, for example, Oberthur Card Systems, 15 James Hance Court, Exton, Pa.

The cards may be constructed by laminating the layers together using heat and pressure. For example, the transaction cards may be roll laminated with adhesives, platen laminated, or other lamination process to laminate the cards together. Processing temperatures may range from about 200° F. to about 500° depending on the material used in the layers of the multilayer transaction card (such as PETG, polycarbonate, or other like materials). For PVC, the temperatures commonly range from about 270° F. to about 320° F. Pressures may range from about 50 psi to about 600 psi. Processing times for laminating the transaction cards of the present invention may range from a few seconds (1-10 seconds, for example if roll laminated with adhesives) to up to about an hour if polycarbonate is used as a material in the multilayer transaction card. For PVC materials, a hot cycle of about 20 to 30 minutes may be used. Cool cycles may last about 15 to about 25 minutes for PVC materials.

In an exemplary embodiment, and especially for IR ink cards, such as, for example, the card described with respect to FIG. 7H, the card layers are fused together in a lamination process using heat and pressure. During the hot press phase, the press is heated to about 300 F. degrees and the pressure builds to about 1000 psi and holds for about 90 seconds. The pressure then ramps up to about 350 psi over an about 30 second period and holds for 16 minutes at the same temperature, namely 300 F. degrees. The card is then transferred to a cold press that is at about 57 F. degrees. The pressure builds to about 400 psi and is held for about 16 minutes as chilled water of about 57 F. degrees is circulated in the plates. The cold press then unloads the card.

With respect to FIGS. 1 and 2, after the laminate is applied, a signature field is applied to the back surface 12 of card 5 (step 175) and the holographic foil 15 is applied to the front 10 of card 5 (step 190). With respect to signature field 45, although prior art signature fields are formed from adhering a paper-like tape to the back 12 of card 5, in an exemplary embodiment of the present invention, the signature field 45 is a translucent box measuring about 2" by 3/8" and is applied to the card using a hot-stamp process. The verification of the signature in signature field 45 by the merchant is often a card 5 issuer requirement for a merchant to avoid financial liability for fraudulent use of card 5. As such, the translucent signature field 45 on the transparent card 5 not only allows the clerk to view at least a portion of the signature field 45 from the front of the card 5, but the signature view also encourages the clerk to turn over card 5 and verify the authenticity of the signature with the signed receipt.

After the card sheets are laminated, the sheets are cut into individual cards 5 (step 180) by a known stamping process, including any necessary curing, burrowing, heating, cleaning and/or sealing of the edges. The individual transaction cards 5 are about 3"×4" and conform to ISO standards for transaction card 5 shape and size. In an exemplary embodiment, the laminated sheets of 56 cards are suitably cut in half on a guillotine device, resulting in two half-sheets of 28 cards. The half-sheets are loaded onto a card punch machine which aligns the sheets to a die (x and y axes) using predetermined alignment marks visible to the optics of the machine. The half-sheets are then fed under the punch in seven steps. Particularly, a fixed distance feed is followed by another optic sensor search to stop the feed at the pre-printed alignment mark, then the machine punches a row of four cards out at one time. After die cutting and finishing according to standard processing, the IR reflection properties are verified in-line (step 185) before application of the holographic foil 15.

With respect to the application of an exemplary holographic foil, the holographic foil 15 is adhered to card 5 (step 190) by any suitable method. In an exemplary embodiment, a substantially square steel die, which is about 1¼"×1¼" with rounded corners and a 0.0007" crown across the contacting surface, stamps out the individual foils 15 from a large sheet of holographic foil 15. The die is part of a hot stamp machine such that the die is sent through a sheet of foil 15, cutting the foil 15 around a particular image and immediately applying the foil 15 with heat to the front 10 surface of card 5 after the card has been laminated. The die temperature is in the range of about 300 F.°+/−10 F.°. The dwell time is approximately ½ seconds and the application speed is set based upon the individual hot stamp applicator; however, the foregoing temperature and dwell is identified for a speed of 100 cards per minute. U.S. Pat. Nos. 4,206,965; 4,421,380; 4,589,686;and 4,717,221 by Stephen P. McGrew provide more details about hot stamping of a holographic image and are hereby incorporated by reference.

With respect to the holographic foil 15, the foil 15 can be any color, contain any hologram, can be applied to any location on card 5, and can be cut to any size, shape and thickness. In an exemplary embodiment, the holographic foil 15 sheet preferably includes a gray adhesive on the bottom side and a blue, mirror-like, three-dimensional holographic surface on the top side containing numerous holographic images about 1¼"×1¼" each. The exemplary hologram includes a 360 degree viewability and diffracts a rainbow of colors under white light. The full color hologram is created by, for example, American Banknote Holographics.

The corners of the individual foil 15 are preferably rounded to minimize the likelihood that the foil 15 will peal away from the surface of card 5. Moreover, when applied to the card, the blue holographic surface faces away from card 5 while the gray adhesive side is applied to card 5 surface. The top surface of the holographic foil 15 may be created by any suitable method such as reflection holographics, transmission holographics, chemical washing, the incorporation of mirror compounds and/or any combination thereof. The holographic foil 15 can be fabricated by, for example, American Banknote Holographics, Inc. located at 1448 County Line Road, Huntingdon Valley, Pa., 19006.

The exemplary holographic foil includes various layers. One skilled in the art will appreciate that any ordering, combination and/or composition of these layers which provides a similar holographic effect is still within the scope of the present invention. In an exemplary embodiment, the holographic transfer foil structure includes the following layers: 90 gauge polyester carrier, release coat, embossable resin, vacuum deposited aluminum, tie coat and size coat. During the transfer process, the embossable resin, vacuum deposited aluminum, tie coat and size coat layers are deposited onto a substrate.

In an exemplary embodiment, the sheets of holographic foil 15 are transmission holograms suitably created by interfering two or more beams of converging light, namely an object beam and reference beam, from a 20 watt Argon laser at 457.9 nm, onto a positive photoemulsion (spun coat plates using shiply photoresist). The system records the interference pattern produced by the interfering beams of light using, for example, a 303A developer. The object beam is a coherent beam reflected from, or transmitted through, the object to be recorded which is preferably a three-dimensional mirror. The reference beam is preferably a coherent, collimated light beam with a spherical wave front 10.

The incorporation of the holographic foil 15 onto a transaction card 5 provides a more reliable method of determining the authenticity of the transaction card 5 in ordinary white light, namely by observing if the hologram has the illusion of depth and changing colors. Thus, to allow the hologram to be viewed with ordinary, white light, when the hologram is recorded onto the transaction card 5, the image to be recorded is placed near the surface of the substrate. Moreover, the hologram is be embossed on a metalized carrier, such as the holographic foil 15, or alternatively the hologram may be cast directly onto the transparent plastic material. When formed on the clear plastic material, the hologram is made visible by the deposit of a visible substance over the embossed hologram, such as a metal or ink. More information regarding the production of holograms on chargecards 5 or the production of holographic foil 15 can be found in, for example, U.S. Pat. No. 4,684,795 issued on Aug. 4, 1987 to United States Banknote Company of New York or from the American Banknote Holographics, Inc. web site at www.abnh.com, both of which are herein incorporated by reference.

In an exemplary embodiment, the application of holographic foil onto vinyl credit cards is accomplished by using a metallized credit card foil. The foil is un-sized, metallized, embossable, abrasion, and chemical resistant hot stamping foil on a 1.0 mil (92 gauge) polyester carrier. All of the exemplary materials are tinted with raw materials supplier color code #563 (blue). The foil is vacuum metallized with aluminum and has an optical density range of about 1.60 to 2.00. The optimum foil is free of visible defects and particulate matter. The foil contains release characteristics of about 0 to 7 grams based upon a release testing unit having a die face of 300 F. degrees, 80 psi, 1.0 seconds dwell, 0.1 seconds delay in the removal of the carrier at a 45 degree angle. An exemplary base material is capable of receiving a permanent, high fidelity (based upon an embossing die of 100%, having at least 70% diffraction efficiency) impression of the holographic image surface by embossing with a hard nickel die in the range of about 1600 pounds per linear inch at about 100 pounds air pressure and in the range of about 200 to 350 F. degrees die temperatures. When testing the embossibility of the base material, the testing includes a primary and secondary image to assure the embossable coating is capable of producing an optimal secondary image.

With respect to the mechanical and chemical durability of the holographic foil, the foil resists abrasions. As such, after sizing and stamping the foil onto the vinyl credit card, the transferred hologram withstands about 100 cycles on the Taber Abrader using CS-10 wheels and about a 500 gram load before signs of breakthrough. The foil resists scuffing such that the foil withstands about 6 cycles on Taber Abrader under the same conditions without any substantial visual marks, scratches or haze. The holographic foil also resists any substantial evidence of cracking the vinyl in the hologram area when embossed on a DC 50000 encoder or an equivalent system. Moreover, the embossed, un-sized foil on the polyester carrier is capable of being stretched 15% without cracking of the base coat. Moreover, the exemplary vinyl card with the exemplary hologram withstands 15 minutes in an oven at 110 C.° with the image clearly visible after the test. Additionally, the exemplary hologram does not show any visible effects after 5 cycles of 8 hours at 0° and 16 hours at 60C°.

The exemplary holograms on the vinyl cards also resist plasticizers, alkalis, acids and solvents. In particular, the cards with holograms withstand immersion in warm liquid plasticizers (typically dioctyl phthalate) up to the point of severe swelling of the card. The image on the card is not substantially affected by contact with plasticized vinyl for a period of 5 days at 60 C.°. With respect to alkalis, the holograms on the cards withstand approximately 1 hour immersion in 10% ammonium hydroxide at room temperature without deterioration. Moreover, the hologram does not show substantial deterioration after 50 hours of immersion at room temperature in artificial alkaline perspiration (10% sodium chloride, 1% sodium phosphate, 4% ammonium carbonate, and pH 8.0). With respect to acids, the exemplary holograms on the cards substantially withstand approximately 1 hour immersion in 10% acetic acid at room temperature without substantial deterioration. Moreover, the exemplary hologram substantially withstand, without substantial deterioration, 50 hours immersion at room temperature in artificial acetic perspiration (10% sodium chloride, 1% sodium phosphate, 1% lactic acid, pH 3.5).

With respect to solvents, the exemplary holograms on cards substantially withstand the following: ethylene glycol (100% and 50% in water) with no substantial effects after 4 hours at room temperature, ethyl alcohol (100% and 50% in water) with no substantial effect after 4 hours at room temperature, methyl ethyl ketone has no substantial effect after 1 minute at room temperature, toluene has no substantial effect up to severe swelling of the card (30 minutes at room temperature), water has no substantial effect after 16 hours at 60 C.° and concentrated laundry detergent has no substantial effect after 20 hours at room temperature.

Moreover, the exemplary holograms on the vinyl cards do not show substantial effects after being washed and dried in a commercial washer and dryer inside a pants pocket at permanent press settings.

The charge card substrate is comprised of a vinyl base or other comparable type material which is suitably capable of accepting a hot stamping of a hologram without substantially violating the present composition of the hologram or its coatings. When adhering the hologram to the vinyl card, the coating exhibits a consistent blush and is uniform in color, viscosity and free of contamination. The adhesion of the hologram to the card is also sufficiently strong enough such that the application of Scotch 610 tape over the hologram which is removed at a 45° angle will not result in a significant amount of foil removed from the substrate.

With respect to the brightness of the image, a diffraction reading is obtained at a minimum of about 2 microwatts on the registration blocks. Moreover, with respect to image quality, the images are substantially free of defects such as large spots, scratches, wrinkles, mottle, haze, and/or any other defects that substantially distort the image.

The final exemplary product is slit at a width of 1 53/64"+/−1/64" and length of 10,000 images per roll. The registration block is located no more than about 5/64" from the edge of the slit material. All finished rolls are wound with the metal side facing in on a 3.0" ID core with a maximum of 3 splices permitted per finished reel and the registration blocks are 0.125"×0.125" square.

After stamping out the individual cards 5 and applying the holographic foil, the IC chip 20 is applied to card 5 (step 195) by any suitable method, such as adhesive, heat, tape, groove and/or the like. More particularly, a small portion of the front 10 of card 5 is machined out using, for example, a milling process. The milling step removes about 0.02 mils of plastic from the front 10 surface, such that the routed hole cuts into the two core layers of plastic, but does not go through the last outer laminate layer of plastic, thereby forming a 5235HST pocket. IC chip 20 is a 5235 palladium plated with silver, rather than the standard gold plating. IC chip 20 is applied to the card using a process known as "potting". Any suitable adhesive, such as a non-conductive adhesive, is placed into the machined hole and the IC chip 20 is placed over the adhesive such that the top surface of the IC chip 20 is substantially even with the front 10 surface of card 5. Suitable pressure and heat is applied to the IC chip 20 to ensure that the IC chip 20 is sufficiently affixed to card 5. The IC chip 20 is any suitable integrated circuit located anywhere on card 5. In an exemplary embodiment, the IC chip 20 structure, design, function and placement conforms to ISO standards for IC chips 20 and smart cards 5. The IC chip 20 may be obtained from, for example, Siemens of Germany.

After applying the holographic foil 15 and the IC chip 20 to card 5, certain information, such as account number 35 and "active thru" 32 date (not shown), are preferably embossed into card 5 (step 200) by known embossing methods. The embossing can be completed by, for example, Oberthur Card Systems. Although any information can be embossed anywhere on card 5, in a particularly exemplary embodiment, the account numbers 35 are embossed through the holographic foil 15 to reduce the possibility of the transfer of the holographic foil 15 to a counterfeit card 5 for fraudulent use. Additionally, although prior art cards 5 include a beginning and ending validity date, the present card 5 only includes an "active thru" 32 date, namely a date in which the card expires.

While the foregoing describes an exemplary embodiment for the fabrication of card 5, one skilled in the art will appreciate that any suitable method for incorporating text 30, 32, 34, logos 50, embossed numbers 35, a magnetic stripe 42, a signature field 45, holographic foil 15, an IC chip 20 and opacity gradient 25 (see FIGS. 1 and 2) onto a substrate is within the scope of the present invention. Particularly, the holographic foil 15, IC chip 20, logo 50, magnetic stripe 40, signature field 45 or any other compound may be affixed to any portion of card 5 by any suitable means such as, for example, heat, pressure, adhesive, grooved and/or any combination thereof.

The present invention has been described above with reference to an exemplary embodiment. However, those skilled in the art having read this disclosure will recognize that changes and modifications may be made to the exemplary embodiment without departing from the scope of the present invention. For example, various steps of the invention may be eliminated without altering the effectiveness of the invention. Moreover, other types of card fabrication, encoding and printing methods may be used such as dye sublimation retransfer technology and/or double transfer technology developed by Dai Nippon Printing Company of Japan. These and other changes or modifications are intended to be included within the scope of the present invention, as expressed in the following claims.

We claim:
1. An article comprising:
   a thermoplastic material having a surface that is transmissive to visible light;
   a first infrared blocking ink incorporated into said thermoplastic material, and
   a second infrared blocking ink associated with said thermoplastic material,
   wherein said article is formed by combining said first infrared blocking ink with said thermoplastic material at a temperature above the melting point of said thermoplastic material,
   wherein said article is formed by screening said second infrared blocking ink onto a surface of said thermoplastic material.
2. The article of claim 1, wherein said article is incorporated into a transaction card.
3. The article of claim 1, wherein said article is capable of blocking infrared light at substantially all points on said surface.
4. The article of claim 1, further comprising a birefringent dielectric multilayer film associated with, and substantially covering, said surface.
5. The article of claim 4, wherein said birefringent dielectric multilayer film is configured to block infrared light in a first wavelength range and said first infrared blocking ink is configured to block infrared light in a second wavelength range.
6. The article of claim 5, wherein said article is incorporated into a transaction card.
7. The article of claim 1, wherein said first infrared blocking ink comprises a rare earth compound.
8. A method comprising:
   combining a first infrared blocking ink with a first thermoplastic material at a temperature above the melting point of said first thermoplastic material to form an infrared blocking thermoplastic material;
   forming an article from said infrared blocking thermoplastic material,
   wherein the thermoplastic material has a surface that is transmissive to visible light and substantially opaque at all points on said surface to infrared light, and
   screening a second infrared blocking ink onto said surface.
9. The method of claim 8, further comprising incorporating said article into a transaction card.
10. The method of claim 8, wherein said first infrared blocking ink is capable of blocking infrared light in a first wavelength range and said second infrared blocking ink is capable of blocking infrared light in a second wavelength range.
11. The method of claim 8, further comprising applying a birefringent dielectric multilayer film to said surface.
12. A transaction card comprising:
   a card body having a surface that is transmissive to visible light;
   a first infrared blocking ink associated with said card body, and
   a second infrared blocking ink associated with said card body,
   wherein said card body is formed by combining said first infrared blocking ink with a thermoplastic material at a temperature above the melting point of said thermoplastic material,
   wherein said transaction card is formed by screening said second infrared blocking ink onto a surface of said card body.
13. The transaction card of claim 12, wherein said transaction card is capable of blocking infrared light at substantially all points on said surface.
14. The transaction card of claim 12, further comprising a birefringent dielectric multilayer film associated with, and substantially covering, said surface.
15. The transaction card of claim 14, wherein said birefringent dielectric multilayer film is configured to block infrared light in a first wavelength range and said first infrared blocking ink is configured to block infrared light in a second wavelength range.
16. The transaction card of claim 12, wherein said first infrared blocking ink comprises a rare earth compound.
17. The transaction card of claim 12, wherein said first infrared blocking ink comprises a rare earth element.
18. The transaction card of claim 12, wherein said second infrared blocking ink comprises a rare earth element.

* * * * *

UNITED STATES PATENT AND TRADEMARK OFFICE
CERTIFICATE OF CORRECTION

| | | |
|---|---|---|
| PATENT NO. | : 8,033,474 B2 | Page 1 of 1 |
| APPLICATION NO. | : 12/907303 | |
| DATED | : October 11, 2011 | |
| INVENTOR(S) | : Ellen Lasch et al. | |

It is certified that error appears in the above-identified patent and that said Letters Patent is hereby corrected as shown below:

IN THE SPECIFICATION:

In column 9 line 41, please delete "08/402,201" and insert therefor --08/402,041--.

Signed and Sealed this
Twenty-fourth Day of January, 2012

David J. Kappos
*Director of the United States Patent and Trademark Office*